(12) United States Patent
Muratov et al.

(10) Patent No.: US 11,527,921 B2
(45) Date of Patent: Dec. 13, 2022

(54) DETECTING FOREIGN OBJECTS IN WIRELESS POWER TRANSFER SYSTEMS

(71) Applicant: MediaTek Inc., Hsin-Chu (TW)

(72) Inventors: Vladimir A. Muratov, Manchester, NH (US); William Plumb, Charlestown, MA (US)

(73) Assignee: MediaTek Inc., Hsin-Chu (TW)

( * ) Notice: Subject to any disclaimer, the term of this patent is extended or adjusted under 35 U.S.C. 154(b) by 0 days.

(21) Appl. No.: 17/093,272

(22) Filed: Nov. 9, 2020

(65) Prior Publication Data

US 2021/0057939 A1 Feb. 25, 2021

Related U.S. Application Data

(63) Continuation of application No. 15/957,704, filed on Apr. 19, 2018, now Pat. No. 10,868,446, which is a continuation-in-part of application No. 15/244,107, filed on Aug. 23, 2016, now Pat. No. 10,199,881.

(60) Provisional application No. 62/488,091, filed on Apr. 21, 2017, provisional application No. 62/245,381, filed on Oct. 23, 2015, provisional application No. 62/245,378, filed on Oct. 23, 2015.

(51) Int. Cl.
*H02J 50/60* (2016.01)
*H02J 50/12* (2016.01)
*H02J 50/10* (2016.01)
*H02J 7/02* (2016.01)

(52) U.S. Cl.
CPC .............. *H02J 50/60* (2016.02); *H02J 7/025* (2013.01); *H02J 50/10* (2016.02); *H02J 50/12* (2016.02)

(58) Field of Classification Search
CPC .. H02J 50/12; H02J 7/025; H02J 50/60; H02J 50/10
See application file for complete search history.

(56) References Cited

U.S. PATENT DOCUMENTS

| | | | |
|---|---|---|---|
| 9,057,753 B2 | 6/2015 | Nakano et al. | |
| 9,178,361 B2 | 11/2015 | Liu et al. | |
| 9,294,153 B2 | 3/2016 | Muratov et al. | |
| 9,360,456 B2 | 6/2016 | Miyamoto | |
| 9,806,769 B2 | 10/2017 | Nakano et al. | |
| 10,199,881 B2 | 2/2019 | Muratov et al. | |
| 10,530,196 B2 | 1/2020 | Oettinger et al. | |
| 10,581,281 B2 | 3/2020 | Muratov | |

(Continued)

FOREIGN PATENT DOCUMENTS

| CN | 105474511 A | 4/2016 |
|---|---|---|
| CN | 106463973 A | 2/2017 |

(Continued)

OTHER PUBLICATIONS

Extended European Search Report for European Application No. EP 16194876.5 dated Mar. 24, 2017.

(Continued)

*Primary Examiner* — Jared Fureman
*Assistant Examiner* — Esayas G Yeshaw
(74) *Attorney, Agent, or Firm* — Wolf, Greenfield & Sacks, P.C.

(57) ABSTRACT

Methods, apparatus and computer-readable storage media for performing foreign object detection (FOD) in a wireless power transfer system. A plurality of FOD measurements may be performed and processed to perform FOD.

15 Claims, 24 Drawing Sheets

(56) References Cited

U.S. PATENT DOCUMENTS

| | | | |
|---|---|---|---|
| 10,868,446 B2 * | 12/2020 | Muratov | H02J 50/60 |
| 10,916,972 B2 | 2/2021 | Muratov et al. | |
| 2010/0001847 A1 | 1/2010 | Takaishi et al. | |
| 2011/0196544 A1 | 8/2011 | Baarman et al. | |
| 2012/0147802 A1 | 6/2012 | Ukita et al. | |
| 2012/0161538 A1 * | 6/2012 | Kinoshita | H02J 50/12 |
| | | | 307/104 |
| 2012/0326660 A1 | 12/2012 | Lu et al. | |
| 2013/0241302 A1 | 9/2013 | Miyamoto et al. | |
| 2014/0077617 A1 | 3/2014 | Nakano et al. | |
| 2014/0084857 A1 | 3/2014 | Liu et al. | |
| 2014/0111019 A1 | 4/2014 | Roy et al. | |
| 2014/0191715 A1 | 7/2014 | Wechlin et al. | |
| 2014/0327393 A1 | 11/2014 | Lee et al. | |
| 2015/0073768 A1 | 3/2015 | Kurs et al. | |
| 2015/0155095 A1 * | 6/2015 | Wu | H02J 50/402 |
| | | | 307/104 |
| 2015/0285926 A1 | 10/2015 | Oettinger | |
| 2015/0309126 A1 * | 10/2015 | Jung | G01C 21/20 |
| | | | 702/150 |
| 2015/0323694 A1 | 11/2015 | Roy et al. | |
| 2015/0331135 A1 | 11/2015 | Widmer | |
| 2016/0065269 A1 | 3/2016 | Yazaki | |
| 2017/0047777 A1 | 2/2017 | Nakano et al. | |
| 2017/0117755 A1 | 4/2017 | Muratov et al. | |
| 2017/0117756 A1 | 4/2017 | Muratov | |
| 2017/0149287 A1 | 5/2017 | Nakano et al. | |
| 2017/0187238 A1 | 6/2017 | Chong et al. | |
| 2017/0229926 A1 | 8/2017 | Oettinger et al. | |
| 2017/0310166 A1 | 10/2017 | Huang et al. | |
| 2018/0241257 A1 | 8/2018 | Muratov et al. | |
| 2018/0342898 A1 | 11/2018 | Ikefuji | |
| 2019/0131826 A1 | 5/2019 | Park et al. | |
| 2019/0199142 A1 | 6/2019 | Muratov et al. | |
| 2020/0235612 A1 | 7/2020 | Muratov | |
| 2020/0259373 A1 | 8/2020 | Park et al. | |
| 2020/0328625 A1 | 10/2020 | Mills | |
| 2021/0242724 A1 | 8/2021 | Muratov et al. | |

FOREIGN PATENT DOCUMENTS

| | | | |
|---|---|---|---|
| EP | 3093955 A1 | 11/2016 | |
| EP | 3107188 A1 | 12/2016 | |
| EP | 3 123 587 | 2/2017 | |
| EP | 3160008 A1 | 4/2017 | |
| KR | 10-2011-0051727 A | 5/2011 | |
| KR | 101 683 651 B1 | 12/2016 | |
| KR | 10-2017-0118571 A | 10/2017 | |
| KR | 2018-0022513 A | 3/2018 | |
| KR | 2018-0065693 A | 6/2018 | |
| TW | 2010-01866 A | 1/2010 | |
| TW | I506916 B | 11/2015 | |
| WO | WO 2005/109598 A1 | 11/2005 | |
| WO | WO 2009/081115 A1 | 7/2009 | |
| WO | WO 2013/164831 A1 | 11/2013 | |
| WO | WO 2013/190809 A1 | 12/2013 | |
| WO | WO 2015/029370 A1 | 3/2015 | |
| WO | WO 2016/006441 A1 | 1/2016 | |
| WO | WO 2017/064955 A1 | 4/2017 | |

OTHER PUBLICATIONS

Extended European Search Report for European Application No. EP 18168832.6 dated Jun. 18, 2018.
Extended European Search Report for European Application No. EP 19204947.6 dated Jun. 12, 2020.
Partial European Search Report for European Application No. EP 19204947.6 dated Apr. 24, 2020.
U.S. Appl. No. 15/244,107, filed Aug. 23, 2016, Muratov et al.
U.S. Appl. No. 16/228,556, filed Dec. 20, 2018, Muratov et al.
U.S. Appl. No. 15/297,226, filed Oct. 19, 2016, Muratov.
U.S. Appl. No. 15/957,704, filed Apr. 19, 2018, Muratov et al.
EP 16194876.5, Mar. 24, 2017, Extended European Search Report.
EP 19204947.6, Apr. 24, 2020, Partial European Search Report.
EP 19204947.6, Jun. 12, 2020, Extended European Search Report.
EP 18168832.6, Jun. 18, 2018, Extended European Search Report.
Extended European Search Report for European Application No. EP 19838641.9 dated Feb. 23, 2022.
Extended European Search Report for European Application No. EP 19838135.2 dated Feb. 23, 2022.
EP 19838641.9, Feb. 23, 2022, Extended European Search Report.
EP 19838135.2, Feb. 23, 2022, Extended European Search Report.
Extended European Search Report for European Application No. EP 22167918.6 dated Jul. 27, 2022.

* cited by examiner

DETECTING FOREIGN OBJECTS IN WIRELESS POWER TRANSFER SYSTEMS

CROSS-REFERENCE TO RELATED APPLICATIONS

This application is a Continuation of U.S. application Ser. No. 15/957,704, filed Apr. 19, 2018, which claims priority to U.S. provisional application Ser. No. 62/488,091, filed Apr. 21, 2017, and is a continuation-in-part of U.S. non-provisional application Ser. No. 15/244,107, filed Aug. 23, 2016, which claims priority to U.S. provisional application Ser. No. 62/245,381, filed Oct. 23, 2015 and U.S. provisional application Ser. No. 62/245,378, filed Oct. 23, 2015, each of which is hereby incorporated by reference in its entirety.

BACKGROUND

1. Technical Field

The techniques described herein relate generally to wireless power delivery, and particularly to detection of foreign objects in the field produced by a wireless power transmitter.

2. Discussion of the Related Art

Wireless Power Transfer Systems (WPTS) are gaining increasing popularity as convenient way to deliver power without wires or connectors. WPTS currently under development in the industry can be separated in two major classes: magnetic induction (MI) systems and magnetic resonance (MR) systems. Both types of systems include a wireless power transmitter and a wireless power receiver. Such systems can be used to power or charge mobile devices such as smartphones or tablet computers, among other applications.

Inductive WPTS typically operate in an allocated frequency range of several hundred kilohertz using frequency variation as a power flow control mechanism.

MR WPTS typically operate on a single resonant frequency using input voltage regulation to regulate output power. In typical applications, MR WPTS operate at a frequency of 6.78 MHz.

Several industry committees have been working on developing international standards for consumer products based on wireless power transfer.

SUMMARY

A method of performing foreign object detection in a wireless power transmission system includes: performing a plurality of FOD (Foreign Object Detection) measurements at different times; processing the plurality of FOD measurements to obtain a FOD measurement result; and determining whether to enable or disable wireless power transfer based on the FOD measurement result.

Processing the plurality of FOD measurements may comprise determining a minimum, average and/or median of the plurality of FOD measurements to obtain the FOD measurement result.

Processing the plurality of FOD measurements may comprise discarding one or more FOD measurements.

A number of the plurality of FOD measurements may be determined before beginning performing the plurality of FOD measurements.

A number of the plurality of FOD measurements may be based upon whether the plurality of FOD measurements converge.

The processing may comprise determining whether the plurality of FOD measurements converge, and, if so, discontinuing further FOD measurements.

The plurality of FOD measurements may be Q-factor measurements or self-resonant frequency measurements.

An apparatus for performing foreign object detection includes circuitry configured to: perform a plurality of FOD (Foreign Object Detection) measurements at different times; process the plurality of FOD measurements to obtain a FOD measurement result; and determine whether to enable or disable wireless power transfer based on the FOD measurement result.

The circuitry may include: a drive circuit configured to energize a matching network and transmit coil of the wireless power transmitter; and a controller configured to perform the plurality of FOD measurements at least in part by controlling the drive circuit, process the plurality of FOD measurements to obtain the FOD measurement result and determine whether to enable or disable wireless power transfer based on the FOD measurement result.

The controller may be configured to process the plurality of FOD measurements at least in part by determining a minimum, average and/or median of the plurality of FOD measurements.

The controller may be configured to discard one or more FOD measurements.

A number of the plurality of FOD measurements may be determined before beginning performing the plurality of FOD measurements.

A number of the plurality of FOD measurements may be based upon whether the plurality of FOD measurements converge.

The controller may be configured to determine whether the plurality of FOD measurements converge, and, if so, discontinue further FOD measurements.

The plurality of FOD measurements may be Q-factor measurements or self-resonant frequency measurements.

A method of performing foreign object detection in a wireless power transmission system having a wireless power transmitter and a wireless power receiver includes: receiving, by the wireless power transmitter, a reference value from the wireless power receiver, the reference value being a reference Q-factor or self-resonant frequency; the wireless power transmitter determining an expected Q-factor or self-resonant frequency for the wireless power transmitter-receiver pair based on the reference value and one or more characteristics of the wireless power transmitter; the wireless power transmitter setting a foreign object detection (FOD) threshold based on the expected Q-factor or self-resonant frequency for the wireless power transmitter-receiver pair; the wireless power transmitter performing an FOD measurement in the presence of the wireless power receiver to obtain an FOD measurement result; the wireless power transmitter determining whether to enable or disable wireless power transfer based on a comparison of the FOD measurement result and the FOD threshold; and the wireless power transmitter performing wireless power transfer to the wireless power receiver when the determination is made to enable wireless power transfer.

The setting of the FOD threshold may be based on a stored relationship between Q-factors or self-resonance frequencies for the transmitter-receiver pair and FOD thresholds.

An apparatus for performing foreign object detection in a wireless power transmission system having a wireless power transmitter and a wireless power receiver includes circuitry configured to: receive a reference value from the wireless power receiver, the reference value being a reference Q-factor or self-resonant frequency; determine an expected Q-factor or self-resonant frequency for the wireless power transmitter-receiver pair based on the reference value and one or more characteristics of the wireless power transmitter; set a foreign object detection (FOD) threshold based on the expected Q-factor or self-resonant frequency for the wireless power transmitter-receiver pair; perform an FOD measurement in the presence of the wireless power receiver to obtain an FOD measurement result; determine whether to enable or disable wireless power transfer based on a comparison of the FOD measurement result and the FOD threshold; and perform wireless power transfer to the wireless power receiver when the determination is made to enable wireless power transfer.

The circuitry may be configured to set the FOD detection result based on a stored relationship between Q-factors or self-resonance frequencies for the transmitter-receiver pair and FOD thresholds.

A method of performing foreign object detection (FOD) prior to initiating wireless power transfer from a wireless power transmitter to a wireless power receiver, the method comprising, by the wireless power transmitter: performing a first FOD measurement; determining whether the first FOD measurement is within a range for initiating wireless power transfer; making a first attempt to communicate with the wireless power receiver when the first FOD measurement is determined to be in range for initiating wireless power transfer, performing a second FOD measurement when the attempt to communicate with the wireless power receiver is successful; determining whether the second FOD measurement is within a range for initiating wireless power transfer; making a second attempt to communicate with the wireless power receiver when the second FOD measurement is determined to be in a range for initiating wireless power transfer; and initiating wireless power transfer when the second attempt is successful.

An apparatus for performing foreign object detection (FOD) prior to initiating wireless power transfer from a wireless power transmitter to a wireless power receiver includes circuitry configured to control the wireless power transmitter to: perform a first FOD measurement; determine whether the first FOD measurement is within a range for initiating wireless power transfer; make a first attempt to communicate with the wireless power receiver when the first FOD measurement is determined to be in range for initiating wireless power transfer, perform a second FOD measurement when the attempt to communicate with the wireless power receiver is successful; determine whether the second FOD measurement is within a range for initiating wireless power transfer; make a second attempt to communicate with the wireless power receiver when the second FOD measurement is determined to be in a range for initiating wireless power transfer; and initiate wireless power transfer when the second attempt is successful.

The foregoing summary is provided by way of illustration and is not intended to be limiting.

BRIEF DESCRIPTION OF DRAWINGS

In the drawings, each identical or nearly identical component that is illustrated in various figures is represented by a like reference character. For purposes of clarity, not every component may be labeled in every drawing. The drawings are not necessarily drawn to scale, with emphasis instead being placed on illustrating various aspects of the techniques and devices described herein.

DETAILED DESCRIPTION

Wireless power transfer can be degraded due to the presence of a foreign object in the field produced by the wireless power transmitter. Conductive objects such as metallic objects may absorb power due to the inducement of eddy currents in the conductive object. The presence of such an object can significantly degrade the efficiency of the wireless power transmission. If a metal object is present, efficiency may be reduced substantially (e.g., from 90% to 40%). Further, due to the power absorbed, the temperature of the object may increase significantly, which may be undesirable. Techniques have been developed for sensing the presence of a foreign object by measuring the quality factor (Q-factor). The presence of a foreign object reduces the Q-factor of the system. Accordingly, measuring the Q-factor can be used to determine if a foreign object is present. For example, if the Q-factor is outside of an acceptable range, it may be determined that a foreign object is present, and wireless power transmission is disabled. On the other hand, if the Q-factor within an acceptable range, it may be determined that no foreign object is present, and wireless power transmission may be allowed. However, the present inventors have discovered a problem with Q-factor-based foreign object detection (FOD). When a user brings a wireless power receiver into the proximity of a wireless power transmitter slowly, there is a possibility of not detecting a foreign object that is present. The reason is that when the two devices are slowly brought into proximity of one another, Q-factor measurement may be initiated while devices are not yet very close together, which results in a higher Q-factor measurement. Undesirably, due to measuring Q-factor too early, the foreign object may not be detected, and wireless power may be enabled even though a foreign object is present.

Figure 1A:
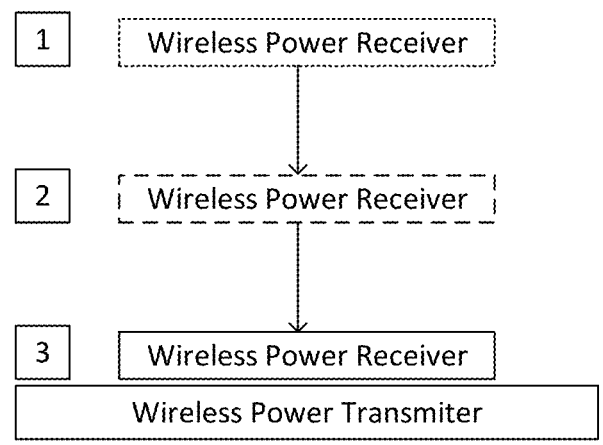
FIGS. 1A and 1B illustrate that Q-factor measurements are higher when a wireless power receiver is farther away from a wireless power transmitter.
Figure 1B:
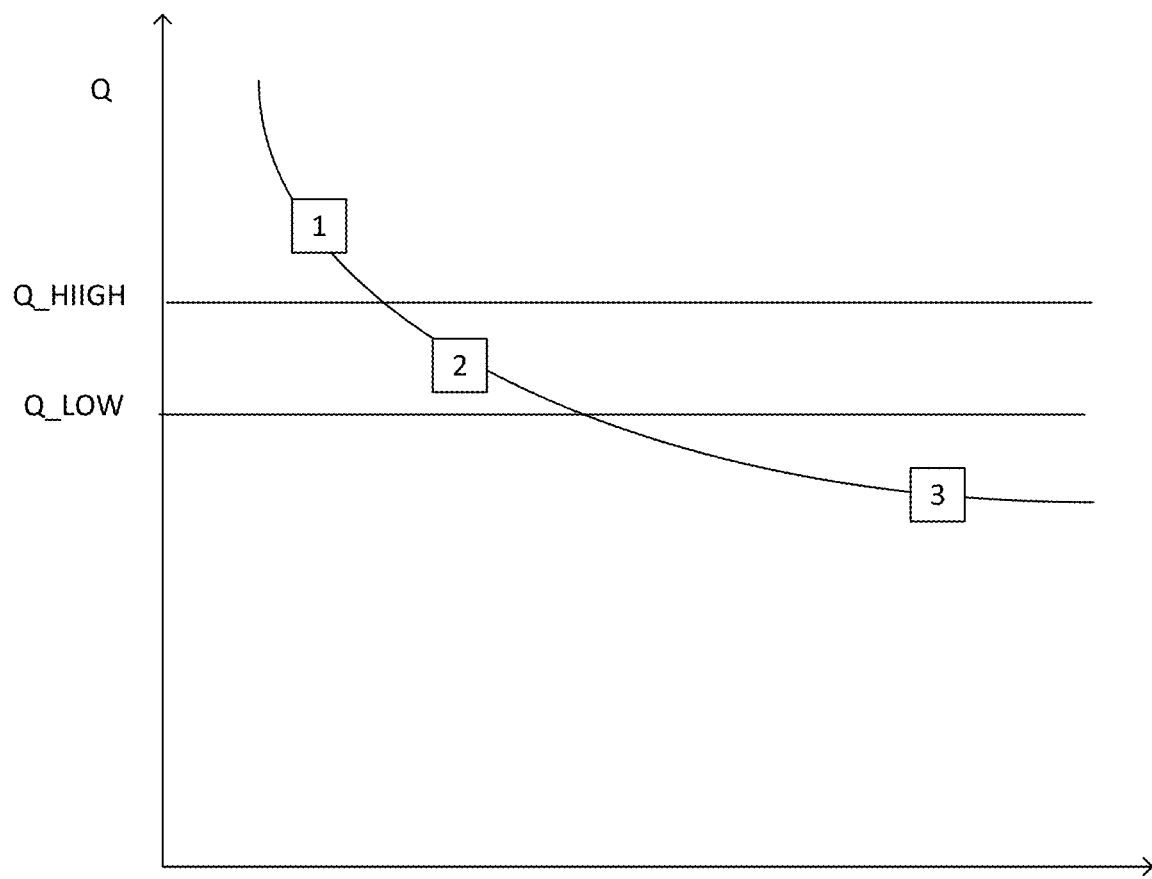

FIGS. 1A and 1B illustrate the problem. FIG. 1A illustrates a wireless power receiver as it is brought closer and closer to a wireless power transmitter (position 1, then position 2, then position 3). In this example, the wireless power transmitter is in the form of a charging pad. The wireless power receiver may be included in a mobile device that is placed on the charging pad to be charged wirelessly. FIG. 1A shows a plot of Q-factor (Q) versus time as the wireless power receiver approaches the wireless power transmitter. The range of Q-factor values for which wireless charging is allowed extends from Q_LOW to Q_HIGH. When the wireless power receiver is at position 1 the Q-factor measured is relatively high, outside of the range for which wireless power transfer is allowed. At position 2, the Q-factor is lower and is between Q_LOW to Q_HIGH. At position 3, where the wireless power receiver ultimately comes to rest, the Q-factor is lower than Q_LOW due to the presence of a foreign object.

If the Q-factor measurement is performed when the wireless power receiver is relatively far away from the wireless power transmitter, such as at position 2, the Q-factor that is measured will be higher than the Q-factor measured when the devices are closer together. As a result, the Q-factor that is measured may be within the range Q_LOW to Q_HIGH, and wireless power transfer may be enabled erroneously. As a result, the wireless power receiver may proceed with wireless power transmission and may not stop even though the Q-factor decreases as the devices are brought closer together. Accordingly, the inventors have recognized that it may be desirable to avoid measuring the Q-factor too early. The present inventors have developed techniques to address this problem using measurements of Q-factor or self-resonant frequency.

Plurality of Q-Factor Measurements

In some embodiments, a plurality of FOD measurements such as Q-factor measurements and/or self-resonant frequency measurements may be made by a wireless power transmitter, and the determination as to whether to enable or disable wireless power transfer may be made based upon a plurality of FOD measurements. Each of the FOD measurements may be made at a different time. There are a number of ways in which the plurality of FOD measurements may be analyzed.

In some embodiments, the plurality of FOD measurements may be analyzed, and the minimum FOD measurements of the plurality of FOD measurements may be used. For example, a minimum Q-factor measurement or self-resonant frequency measurement may be used. Using the minimum FOD measurements may help ensure that a FOD measurements taken when the wireless power transmitter and receiver are far apart from one another is not used. For example, if three Q-factor measurements are made when the wireless power receiver is at positions 1, 2 and 3 in FIGS. 1A and 1B, the three Q-factor measurements are analyzed to determine the minimum. In this case, the Q-factor measurement made at position 3 is the lowest, and is selected for use in determining whether to enable or disable wireless power transfer.

However, the techniques described herein are not limited to determining the FOD measurements, as other suitable values may be used such as the average or median FOD measurements, such as the average or mean Q-factor, for example. Determining the average or median FOD measurement may allow reducing the effect of erroneous measurements. As another example, the highest Q-factor measurement or a number of highest Q-factor measurements may be discarded, and then the remaining Q-factor measurements may be processed (e.g., by determining the minimum, average, or median of the remaining subset) to determine a value to use for determining whether to enable or disable wireless power transfer.

Figure 2:
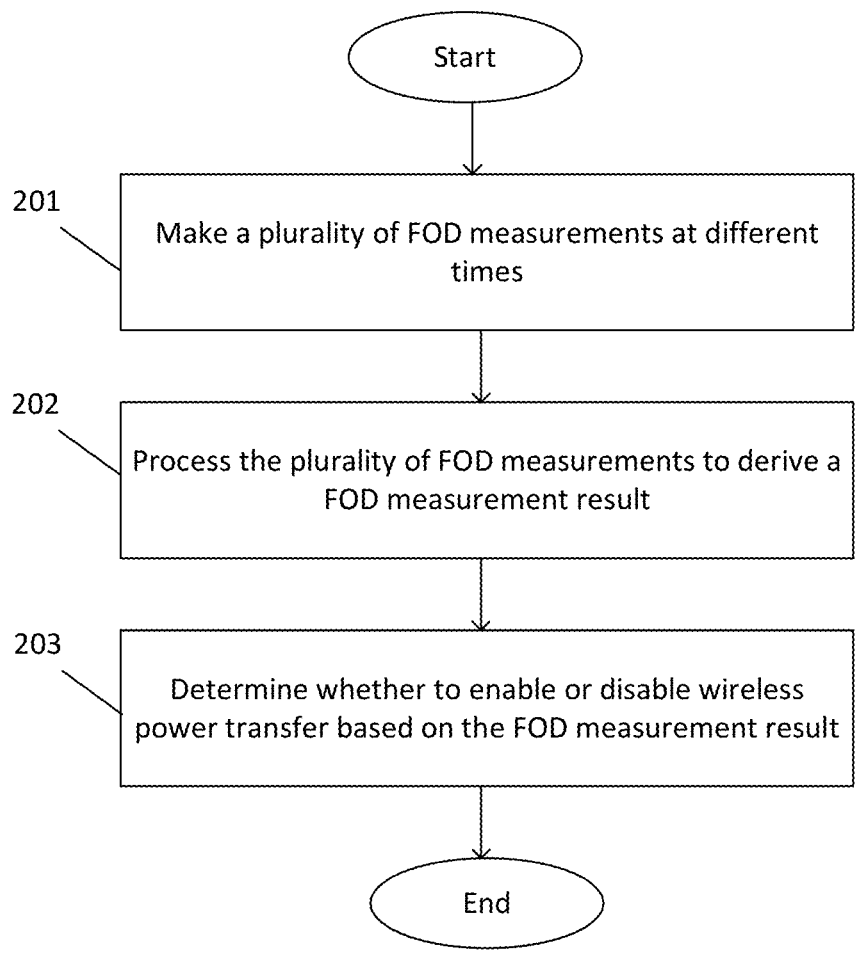
FIG. 2 shows a flowchart of a method of foreign object detection that includes making a plurality of Q-factor measurements at different times.

FIG. 2 shows a flowchart of a method 200 of performing foreign object detection, according to some embodiments. In step 201, a plurality of FOD measurements may be made at a plurality of times. Any suitable number of FOD measurements may be made, such as an integer number between two and one hundred, inclusive. In some embodiments, a predetermined number of FOD measurements may be made. In some embodiments, the number of FOD measurements that are made may be adaptive. For example, in some embodiments FOD measurements may terminate once the FOD measurements converge. One criteria for determining whether FOD measurements have converged is to determine whether a difference between successive FOD measurements is below a threshold, or whether the rate of change is below a threshold. By determining whether FOD measurements have converged, this can help ensure that the wireless power transmitter and wireless power receiver are no longer moving with respect to one other (e.g., the wireless power receiver may have come to rest on the wireless power transmitter). In step 201, the plurality of FOD measurements may be analyzed to derive a suitable FOD measurement value to use for foreign object detection. Any of the processing mentioned above may be performed on the plurality of FOD measurements, such as determining a minimum, average, or median, of the plurality of FOD measurements or a subset thereof. Alternatively, the most recent FOD measurement may be used, or a processed version of the most recent FOD measurements, on the assumption that the FOD measurements have converged. The result of the processing in step 202 is termed a "FOD measurement result." In step 203, the FOD measurement result is used to determine whether to enable or disable wireless power transfer. For example, the a FOD measurement result that is a Q-factor result may be compared to Q_HIGH and Q_LOW, and if the Q-factor result is not within the range between Q_HIGH and Q_LOW, power transfer may be disabled. Conversely, if the Q-factor result is within the range between Q_HIGH and Q_LOW, wireless power transfer may be enabled. A similar technique may be used if the FOD measurement result is a self-resonant frequency result.

Although techniques are described above for performing foreign object detection based on a plurality FOD measurements, the inventors have appreciated that the problem may be solved if the wireless power transmitter and wireless power receiver are within a suitable proximity of one another for performing foreign object detection. Various techniques, such as the above-described FOD measurements and/or other techniques may be used to determine the wireless power transmitter and wireless power receiver are within a suitable proximity of one another for performing foreign object detection.

Plurality of Handshake Sequences

As discussed further below, a wireless power transmitter and a wireless power receiver may have the capability of communicating with one another, either in-band our out-of-band. Prior to delivering a substantial level of wireless power, the wireless power transmitter and wireless power receiver may perform a handshake sequence to confirm that no foreign object is present and the devices are compatible with one another.

A handshake sequence may include performing an FOD measurement by the wireless power transmitter. The FOD measurement may be performed by energizing the transmit coil by the driver circuit at a low power level, lower than that which would wake up the electronics of the wireless power receiver. If the FOD measurement is within an acceptable range of values, the wireless power transmitter attempts to communicate with the wireless power receiver. The attempt to communicate may entail the wireless power receiver transmitting sufficient level of wireless power to wake up and power the electronics of the wireless power receiver, but a lower amount of power than that which is transferred once the handshake process is successfully completed. The attempt to communicate may entail exchanging information between the wireless power transmitter and the wireless power receiver. The exchanged information may include reference information for performing foreign object detection such as the Q-factor of the wireless power receiver and/or the resonance frequency of the wireless power receiver for power transfer without a foreign object present. Such information may be sent from the wireless power receiver to the wireless power transmitter. Other information may be sent by the wireless power receiver or wireless power transmitter to the other device. The attempt to communicate may entail a negotiation as to parameters of the wireless power transmission.

In the WPC specification, the FOD measurement may correspond to an "analog ping" and the attempt to establish communication may correspond to a "digital ping." A FOD measurement within an acceptable range may be termed a "successful analog ping." A successful attempt to communicate with the wireless power receiver that results in a reply in acknowledgement may be termed a "successful digital ping." However, the techniques described herein are not limited to wireless power transfer in accordance with the WPC specification, as they apply to other wireless transfer technologies, as well.

After a successful handshake sequence, the devices may, from time to time, attempt to exchange signals to confirm they remain in communication with one another, and/or may re-start the handshake sequence. Either may be performed periodically and/or in response to system events.

As mentioned above, the inventors have recognized and appreciated that an FOD measurement is more reliable by verifying the wireless power transmitter and wireless power receiver are within suitable proximity of one another. This may be done in a number of ways. In some embodiments, the handshake sequence of an FOD measurement followed by an attempt to communicate (e.g., an analog ping followed by a digital ping) may be repeated prior to initiating wireless power transfer. Repeating the handshake sequence can help to ensure that an FOD measurement is performed when the wireless power transmitter and wireless power receiver are close enough to one another for a reliable FOD measurement.

Figure 3A:
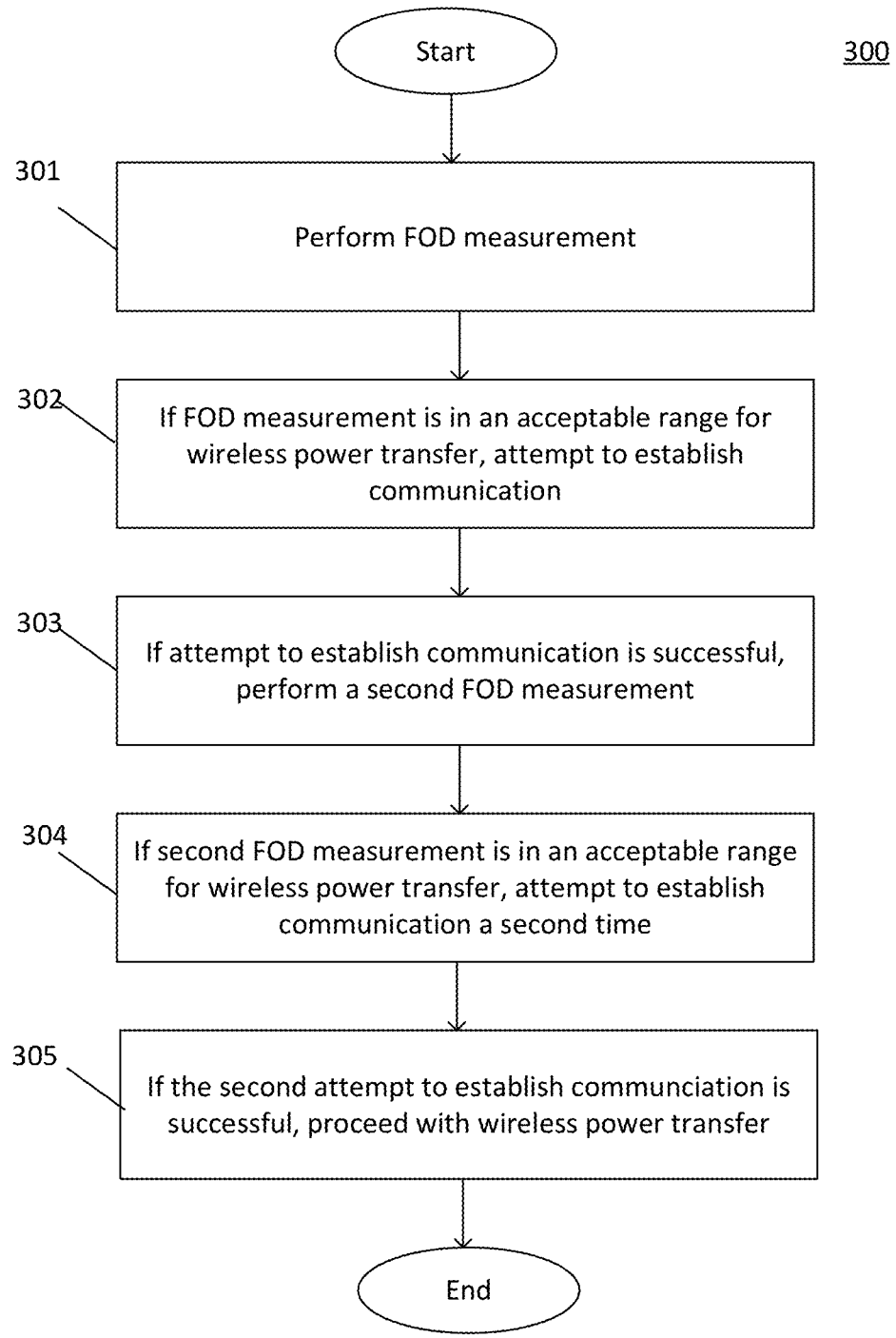
FIG. 3A shows a flowchart of a method of foreign object detection that includes measuring Q-factor after establishing the wireless power transmitter and receiver are able to communicate.

FIG. 3A shows a flowchart of a method of performing foreign object detection to initiate wireless power transfer, according to some embodiments. In step 301, receiver first FOD measurement is performed. Any suitable type of FOD measurement may be performed, such as those described herein. In step 302, it is determined whether the FOD measurement is in an acceptable range for wireless power transfer. This may be done by any suitable technique, such as those described herein. If the FOD measurement is not in an acceptable range, the method re-starts at step 301. If the FOD measurement is in an acceptable range, the wireless power transmitter attempts to communicate with the wireless power receiver. If the attempt to communicate is successful, the method proceeds to step 303. If not, the method re-starts at step 301. In step 303 a second FOD measurement is performed. Any suitable type of FOD measurement may be performed, such as those described herein. In step 304, it is determined whether the second FOD measurement is in an acceptable range for wireless power transfer. This may be done by any suitable technique, such as those described herein. The second FOD measurement may be performed according to the same technique as the first FOD measurement, or may be performed by a different technique. If the second FOD measurement is not in an acceptable range, the method re-starts at step 301. If the second FOD measurement is in an acceptable range, the wireless power transmitter attempts to communicate with the wireless power receiver a second time. If the second attempt to communicate is successful, the process of initiating wireless power transfer proceeds, and wireless power is transferred. If the second attempt to communicate is not successful, the method re-starts at step 301. FIG. 3A shows an example in which the handshake sequence is repeated once. However, the handshake sequence may be repeated once or more than once, such as twice or three times or more, prior to initiating wireless power transfer.

Variable Threshold for Enabling Power Transfer

In some embodiments, the threshold used for determining whether to enable wireless power transfer may be variable rather than static. For example, rather than using a static threshold of Q-factor or self-resonant frequency to determine whether wireless power transfer should be enabled, the threshold may be set based on the expected value of Q-factor or self-resonant frequency. The inventors have recognized and appreciated that smaller variations in Q-factor and self-resonant frequency occur when a wireless power receiver has a relatively low Q-factor. For example, a wireless power transmitter-receiver pair having a Q-factor of 120 without a foreign object present may have its Q-factor drop below 60 when a foreign object is present. By contrast, a wireless power transmitter-receiver pair having a Q-factor of 40 without a foreign object present may have its Q-factor drop below 30 when a foreign object is present. Thus, the drop in Q-factor is more subtle when a wireless power transmitter-receiver pair has a relatively low Q-factor.

In some embodiments, the threshold for enabling or disabling wireless power transfer may be set by the wireless power transmitter in dependence on an expected Q-factor or self-resonant frequency of the wireless power wireless power transmitter-receiver pair when no foreign object is present. A wireless power receiver may store (e.g., in memory of the wireless power receiver) a reference Q-factor or reference self-resonant frequency that that is indicative of the Q-factor or self-resonant frequency measured by a reference wireless power transmitter in the presence of the wireless power receiver. Such values may be determined by calibration measurements using the reference wireless power transmitter, for example. The characteristics of wireless power transmitters may vary from those of a the reference wireless power transmitter. Accordingly, the wireless power transmitter may store (e.g., in memory of the wireless power transmitter) information indicating how its characteristics differ with respect to the reference wireless power transmitter as it pertains to Q-factor or self-resonant frequency. Using the reference information stored by the wireless power receiver and the characteristics stored by the wireless power transmitter, an expected Q-factor or self-resonant frequency for the wireless power transmitter-receiver pair can be determined. Such a determination may be performed by any suitable device, such as the wireless power transmitter, for example. The determination may be made in any suitable way, such as by such as a lookup table, equation or curve, for example, expressed in any suitable way.

In some embodiments, the reference Q-factor or reference self-resonant frequency stored by the wireless power receiver may be transmitted from the wireless power receiver to the wireless power transmitter (e.g. during the handshake sequence). The wireless power transmitter may then use the received reference information from the wireless power receiver and its stored characteristics to calculate or otherwise determine the expected Q-factor or self-resonant frequency for the wireless power transmitter-receiver pair. The threshold for enabling wireless power transfer may then be determined based upon the expected Q-factor or self-resonant frequency.

To determine the threshold, a wireless power transmitter may store (e.g. in memory) a relationship between Q-factors and/or self-resonant frequencies of the transmitter-receiver pair when no foreign object is present and suitable thresholds. The stored relationship may be a mapping from the Q-factors or self-resonant frequencies to a suitable threshold. The mapping make take any form, such as a lookup table, equation or curve, for example, expressed in any suitable way. The drop in Q-factor or increase in self-resonant frequency that indicates a foreign object may be proportional to the Q-factor of the wireless power transmitter-receiver pair when no foreign object is present. For example, when a wireless power transmitter-receiver pair has an expected Q-factor of 120, the threshold may be set to a Q-factor of 50%, such that a Q-factor measurement below 60 will trigger detection of a foreign object. When a wireless power transmitter-receiver pair has an expected Q-factor of 40, the threshold may be set to 75% of Q-factor (or a 25% drop), such that a Q-factor measurement below 30 will trigger detection of a foreign object.

Figure 3B:
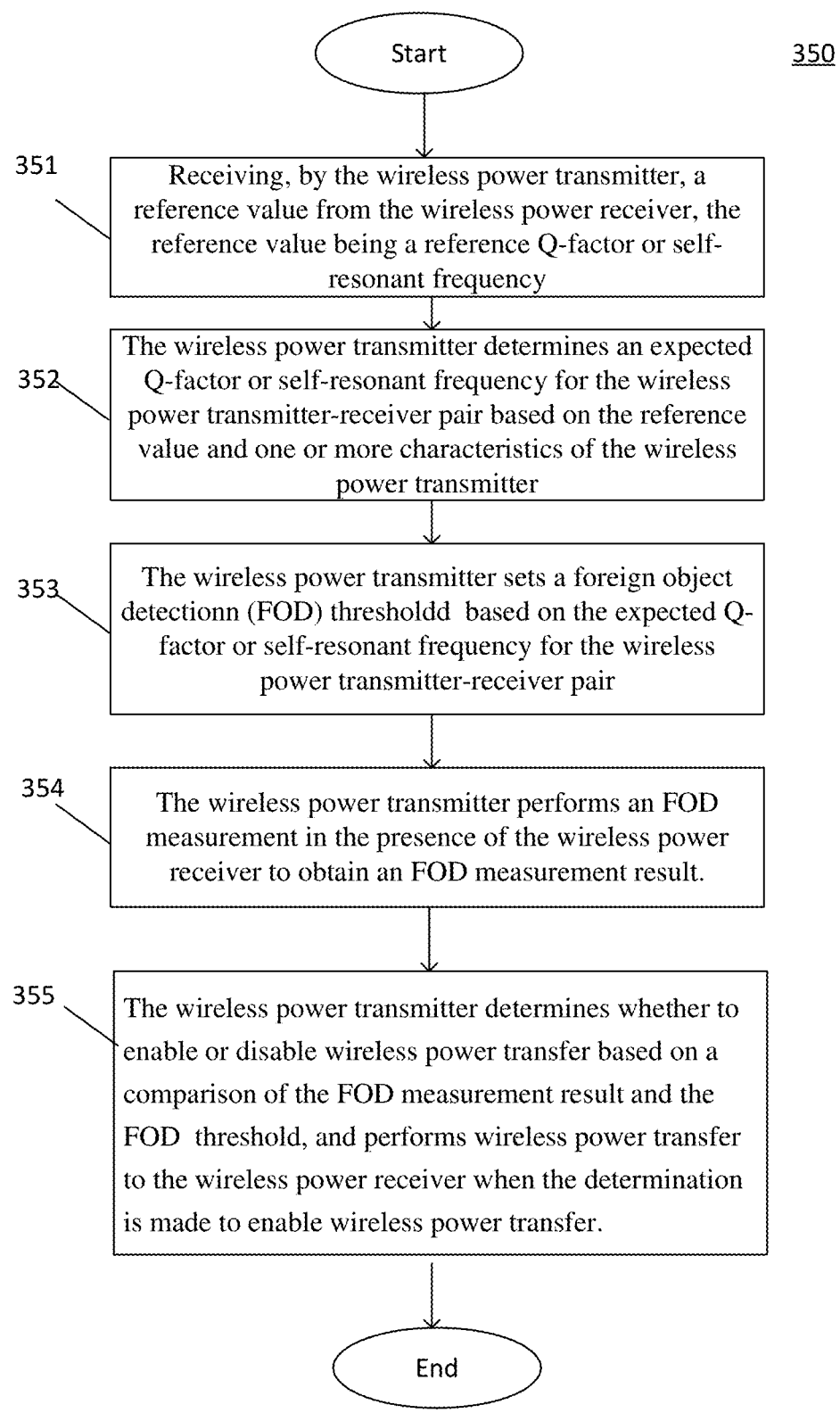
FIG. 3B shows a method of performing foreign object detection in a wireless power transmission system having a wireless power transmitter and a wireless power receiver.

FIG. 3B shows a method 350 of performing foreign object detection in a wireless power transmission system having a wireless power transmitter and a wireless power receiver. The method includes, in step 351, receiving, by the wireless power transmitter, a reference value from the wireless power receiver, the reference value being a reference Q-factor or self-resonant frequency. In step 352 the wireless power transmitter determines an expected Q-factor or self-resonant frequency for the wireless power transmitter-receiver pair based on the reference value and one or more characteristics of the wireless power transmitter. In step 353, the wireless power transmitter sets a foreign object detection (FOD) threshold based on the expected Q-factor or self-resonant frequency for the wireless power transmitter-receiver pair. In step 354, the wireless power transmitter performs an FOD measurement in the presence of the wireless power receiver to obtain an FOD measurement result. In step 355, the wireless power transmitter determines whether to enable or disable wireless power transfer based on a comparison of the FOD measurement result and the FOD threshold, and performs wireless power transfer to the wireless power receiver when the determination is made to enable wireless power transfer.

System Description and Q-Factor Measurements

The techniques and devices described herein enable the detection of a foreign object using relatively low power levels. In some embodiments, detection may be performed by energizing and controlling the drive circuit of a wireless power transmitter, and measuring a characteristic of a transient in the wireless power transmitter. Based on the transient characteristic the wireless power transmitter can determine whether a foreign object is present in the field produced by the wireless power transmitter. However, Q-factor can be measured in any suitable way, and is not limited to measuring a characteristic of a transient. In some embodiments, the Q-factor may be detected by frequency-domain measurements, or a combination of time-domain and frequency-domain measurements. Advantageously, in some embodiments detection of a foreign object may be performed without the need to add additional hardware.

Figure 4:
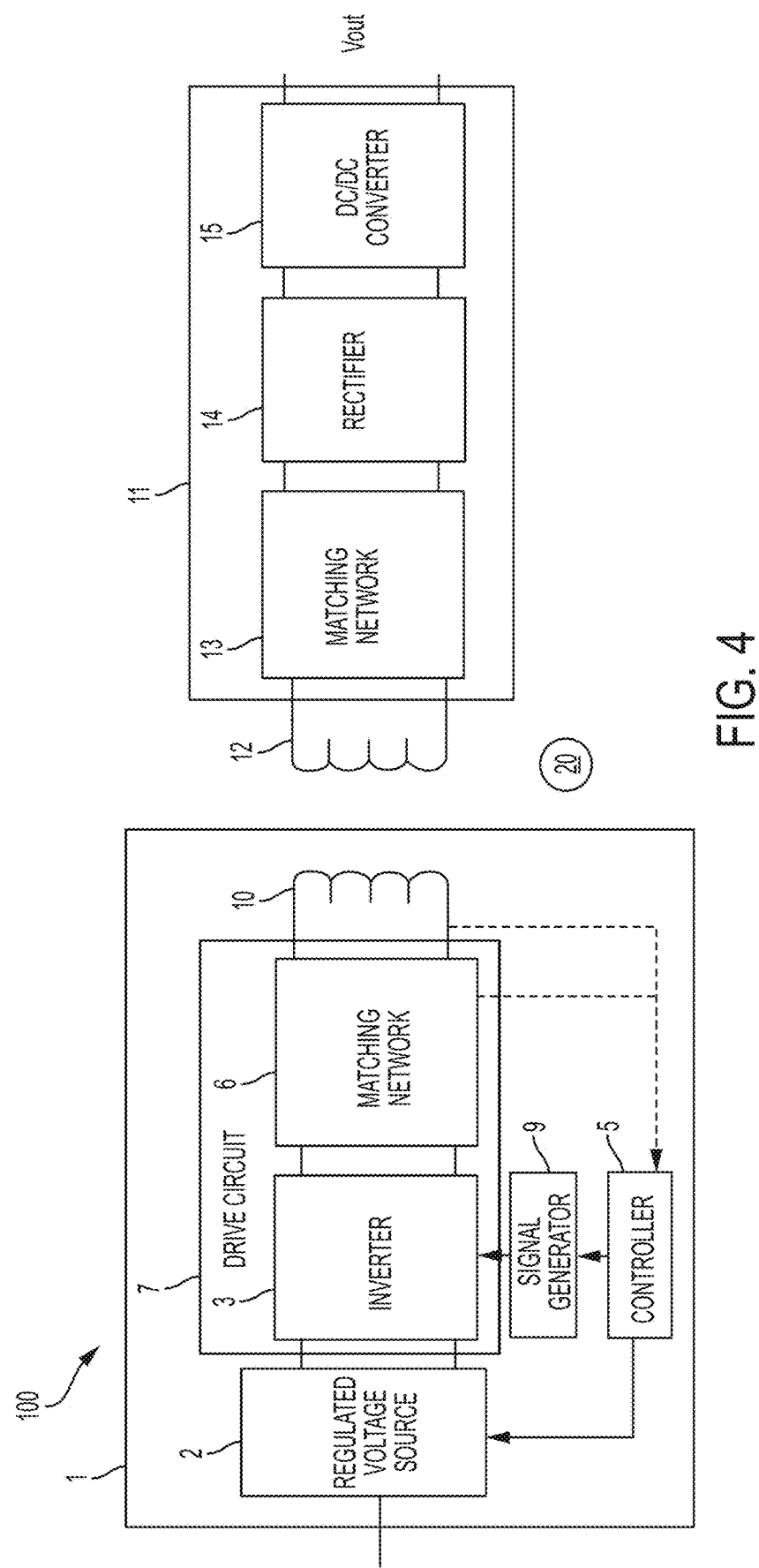
FIG. 4 shows a block diagram of a wireless power system including a wireless power transmitter and a wireless power receiver.

FIG. 4 shows a block diagram of a wireless power system 100 including a wireless power transmitter 1 and a wireless power receiver 11. The wireless power transmitter 1 has a drive circuit 7 including an inverter 3 that drives a transmit coil 10 through a matching network 6. The wireless power transmitter 1 may include a regulated voltage source 2 (e.g., a voltage regulator) that provides a regulated DC voltage to the inverter 3. The regulated voltage source 2 produces a regulated DC output voltage in response to control stimulus from the controller 5. In some embodiments, the drive circuit 7 may be a class D or E amplifier that converts the DC voltage at the input of inverter 3 into an AC output voltage to drive the transmit coil 10. Producing an AC output voltage enables wireless power transmission through electromagnetic induction. The controller 5 may control a signal generator 9 to drive the inverter 3 with signals of a selected wireless power transmission frequency. As an example, the inverter 3 may be switched at a frequency between 100 and 205 kHz to transmit power to a wireless power receiver designed to receive wireless power according to the Qi specification for low power Qi receivers and 80-300 kHz for medium power Qi receivers. The inverter 3 may be switched at a higher frequency, such as a frequency of greater than 1 MHz, within an ISM band, e.g., 6.765 MHz to 6.795 MHz, to transmit power to a receiver designed to receive wireless power using MR technology. However, these frequencies are described merely by way of example, as wireless power may be transmitted at a variety of suitable frequencies, in accordance with any suitable specification. Controller 5 may be an analog circuit or a digital circuit. Controller 5 may be programmable, and may command signal generator 9 to produce signals at a desired transmission frequency based on stored program instructions, so that inverter 3 switches at the desired transmission frequency. Matching network 6 may facilitate wireless power delivery by presenting a suitable impedance to the inverter 3. The matching network(s) may have one or more capacitive or inductive elements or any suitable combination of capacitive and inductive elements. Since the transmit coil 10 may have an inductive impedance, in some embodiments the matching network 6 may include one or more capacitive elements, which, when combined with the impedance(s) of the transmit coil 10, presents an impedance to the output of inverter 3 suitable for driving the transmit coil 10. In some embodiments, during wireless power transfer the resonant frequency of the matching network 6 may be set equal to or approximately equal to the switching frequency of the inverter 3. The transmit coil 10 may be realized by any suitable type of conductors. The conductors may be wires, including solid wire or Litz wire, or patterned conductors, such as patterned conductors of a PC board or an integrated circuit.

The AC current in the transmit coil 10 generates an oscillating magnetic field in accordance with Ampere's law. The oscillating magnetic field induces an AC voltage into a receiver coil 12 of the wireless power receiver 11 in accordance with Faraday's law. The AC voltage induced in the receiver coil 12 is provided through a matching network 13 to a rectifier 14 that generates an unregulated DC voltage. Rectifier 14 may be a synchronous rectifier or may be implemented using diodes. The unregulated DC voltage is regulated using a DC/DC converter 15, the output of which may be filtered and provided to a load as output voltage Vout. In some alternate embodiments the DC/DC converter 15 can be replaced by a linear regulator or battery charger, or eliminated altogether. In some embodiments, the wireless power transmitter receiver 1 may have communication circuitry (e.g., within controller 5) for communicating with wireless power receiver 11 either through in-band communication or out of band communication. Similarly, wireless power receiver 11 may have communication circuitry for communicating with a wireless power transmitter 1. The wireless power receiver 11 may send feedback information to the wireless power transmitter 1 indicating the power demanded at the wireless power receiver 11, or a change in the power level to be provided. In response, the wireless power transmitter 1 may increase or decrease its power output accordingly. The wireless power transmitter 1 may control the amount of power transmitted by varying the voltage drive level, the frequency of the signal transmitted or both. Any suitable power control techniques may be used.

As shown in FIG. 4, if a conductive foreign object 20 enters the field produced by the transmit coil 10 of the wireless power transmitter 1, the wireless power transmission efficiency may be degraded and/or the conductive foreign object 20 may undergo significant heating. Examples of conductive foreign objects 20 include coins, paperclips, and keys, by way of illustration.

According to the techniques described herein, the wireless power transmitter 1 may be controlled to perform foreign object detection prior to wireless power transmission. Performing foreign object detection allows the wireless power transmitter to determine whether or not to perform wireless power transmission.

Foreign object detection may be performed as follows. When the wireless power transmitter 1 performs foreign object detection it may increase the energy stored in one or more components of the matching network 6 and/or transmit coil 10. A resonance in matching network 6 and/or transmit coil 10 is excited and allowed to decay. A temporal characteristic of the decay of the resonance is measured. Since the rate of decay of the resonance is different depending on whether or not a foreign object 20 is present, the temporal characteristic of the resonance decay can be analyzed to determine whether or not a foreign object 20 is present. Wireless power transmission can be enabled or inhibited based on this analysis. If a foreign object is determined to be present, wireless power transmission can be disabled. If a foreign object is determined not to be present, wireless power transmission may be enabled.

Figure 5:
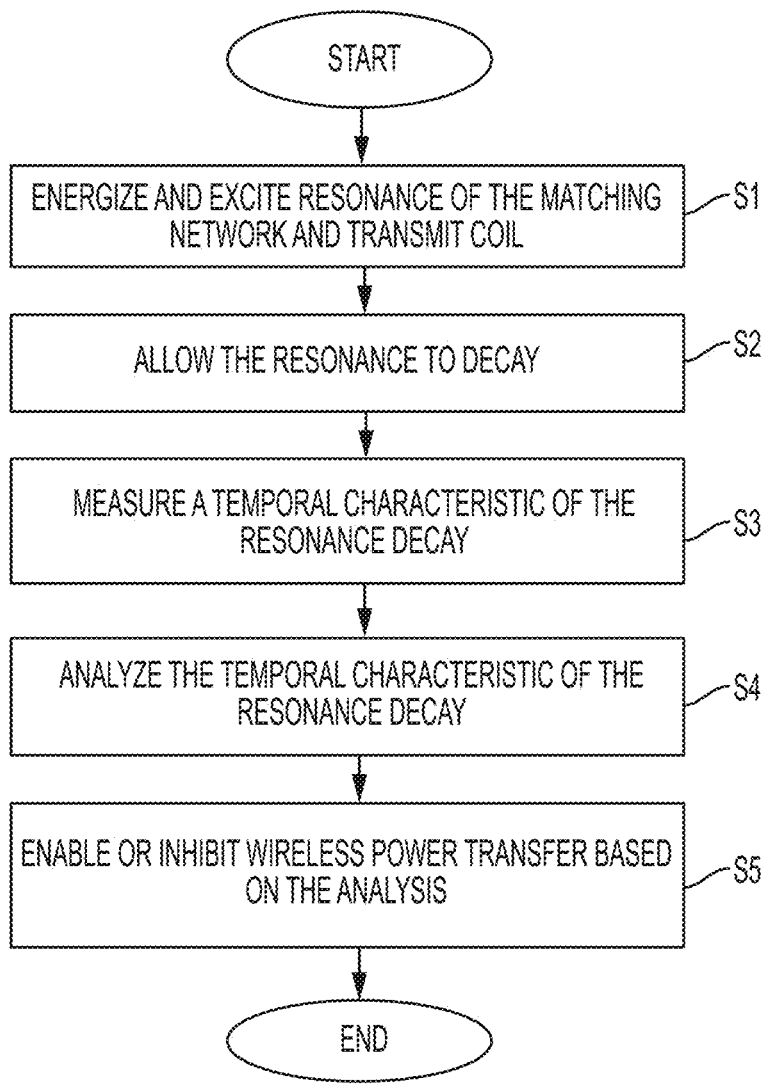
FIG. 5 shows a flowchart of a method of performing foreign object detection.

FIG. 5 shows a flowchart of a method of performing foreign object detection, according to some embodiments. Such a method may be performed by the wireless power transmitter 1. Specifically, controller 5 may be configured to control performing the method. In step S1, the matching network 6 and/or the transmit coil 10 is energized. Step S1 may be performed by increasing the energy stored in one or more passive components in the matching network 6 and/or transmit coil 10. Matching network 6 and/or the transmit coil 10 may be energized by switching inverter 3 while inverter 3 is powered by a suitable supply voltage. Examples of suitable switching frequencies and supply voltages are discussed below. However, the network 6 and/or the transmit coil 10 need not be energized by switching the inverter at a switching frequency. To increase the energy stored, a voltage may be applied across a capacitor of the matching network 6 to increase the energy stored in the capacitor, a current may be applied to the transmit coil 10 which may increase the energy stored in its inductance, or the energy stored in both may be increased. In some embodiments, when the wireless power transmitter is energized in the foreign object detection mode it is energized at a lower level than when in the wireless power transmitter is in the power transmission mode. A lower voltage and/or current may be applied to the matching network 6 and/or the transmit coil 10 as compared to the voltage and/or current applied in the power transmission mode, which can limit the power consumed for foreign object detection.

The resonance may be excited by switching one or more switches of the inverter 3 into a state that causes a capacitor of the matching network 6 to resonate with the inductance of the transmit coil 10. For example, the inverter may be switched at a suitable switching frequency. When the resonance is excited the capacitor of the matching network 6 exchanges energy with the inductance of the transmit coil 10 at the resonant frequency.

In step S2, the resonance between the matching network and transmit coil is allowed to decay. Energy transfer into matching network and transmit coil may be inhibited in step S2, so that the matching network and transmit coil can resonate freely without the addition of energy. As an example, if step S1 includes switching the inverter 3 at a switching frequency, the switching may be stopped in step S2, and the inverter kept in a state that does not allow energy to flow into the matching network or transmit coil. For example, the output of the inverter may be held in a low impedance state. The output voltage may be held constant at a fixed voltage (e.g., a common mode voltage such as ground, or VDC) by turning on the appropriate transistor(s) of the inverter. The resonance is allowed to decay freely. If a foreign conductive object 20 is present in the field produced by transmit coil 10, eddy currents are induced in the object 20 which loads the resonant network formed by the matching network 6 and transmit coil 10, causing the resonance to decay more rapidly than if no foreign object is present. Accordingly, the speed of decay of the resonance is indicative of whether a foreign conductive object 20 is present.

In step S3, a temporal characteristic of the resonance decay may be measured. As should be appreciated, step S3 may be performed at least partially at the same time as step S2. To measure a temporal characteristic of the resonance decay, one or more measurements of the matching network 6 and/or transmit coil 10 may be made to detect how quickly the resonance changes. The measurement(s) may be made by controller 5, which may include suitable measurement circuitry, or a separate measurement circuit. Any suitable parameters may be measured, such as the current or voltage, for example. As shown by the dashed lines in FIG. 4, the measurement(s) may be made at the matching network 6 and/or the transmit coil 10.

In some embodiments, the decay may be exponential, and the speed of the decay may be represented by a time constant. Determining the temporal characteristic may include measuring a time constant or a value indicative thereof. In some embodiments, the temporal characteristic may be determined by calculating a ratio of the currents or voltages as they decay over time.

In step S4, the temporal characteristic may be analyzed to determine whether it is indicative of the presence of a foreign object. In some embodiments, the quality factor Q of the wireless power transmitter 1 may be determined based on the temporal characteristic and/or the measurements themselves. As an example of the analysis that may be performed in step S4, the temporal characteristic or quality factor Q may be compared to data indicating expected temporal factors or quality factors Q. For example the wireless power transmitter 1 may store data (e.g., in non-volatile memory) representing quality factors Q of known wireless power receivers. The quality factor Q determined from the measured temporal characteristic may be compared with the stored data, and if it differs from the expected value(s) by more than a threshold amount the measured quality factor may be indicative of the presence of a foreign conductive object 20. As another example, the wireless power transmitter 1 may receive data from the wireless power receiver 11 indicating the quality factor Q of the wireless power receiver 11. The quality factor Q determined from the measured temporal characteristic may be compared with the received quality factor Q of the receiver, and if it differs from that of the receiver by more than a threshold amount the measured quality factor may be indicative of the presence of a foreign conductive object 20.

Figure 6A:
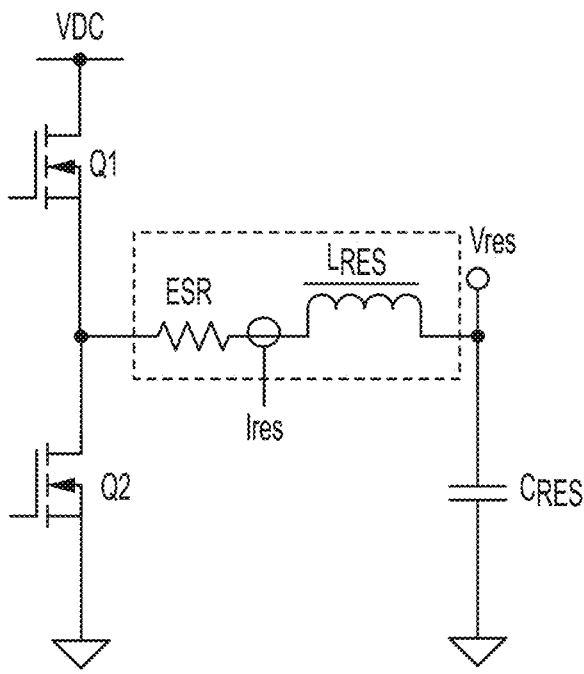
FIGS. 6A-6C show examples of a drive circuit implemented as class D amplifiers.
Figure 6B:
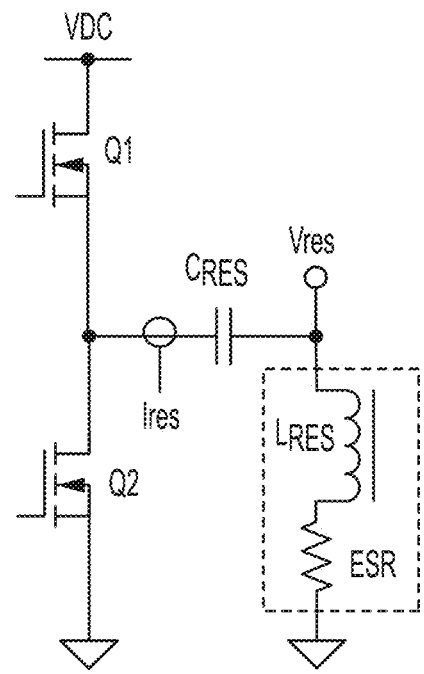
Figure 6C:
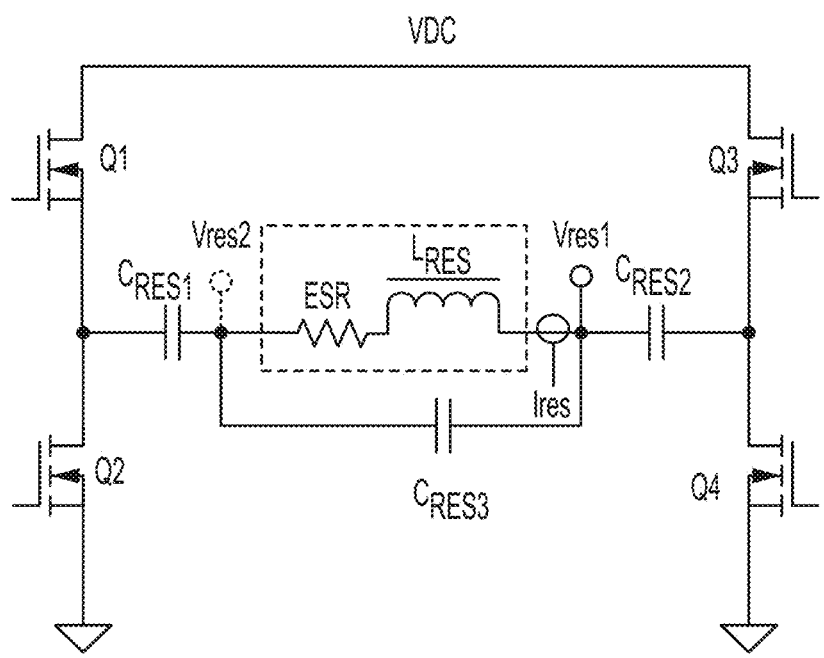
Figure 7A:
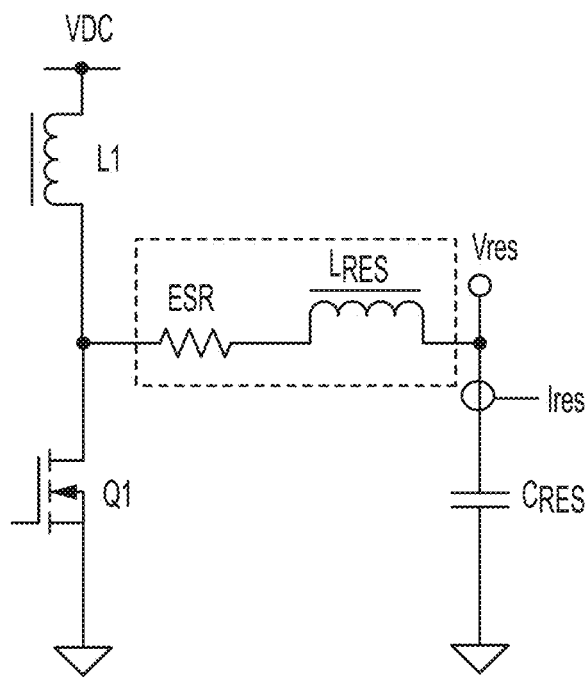
FIGS. 7A-7C show examples of a drive circuit implemented as class E amplifiers.
Figure 7B:
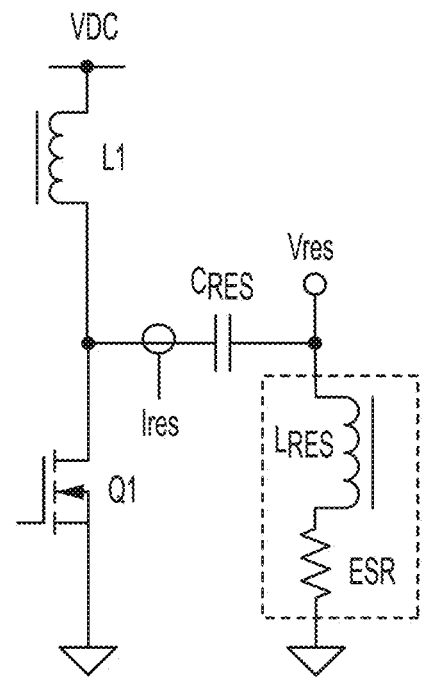
Figure 7C:
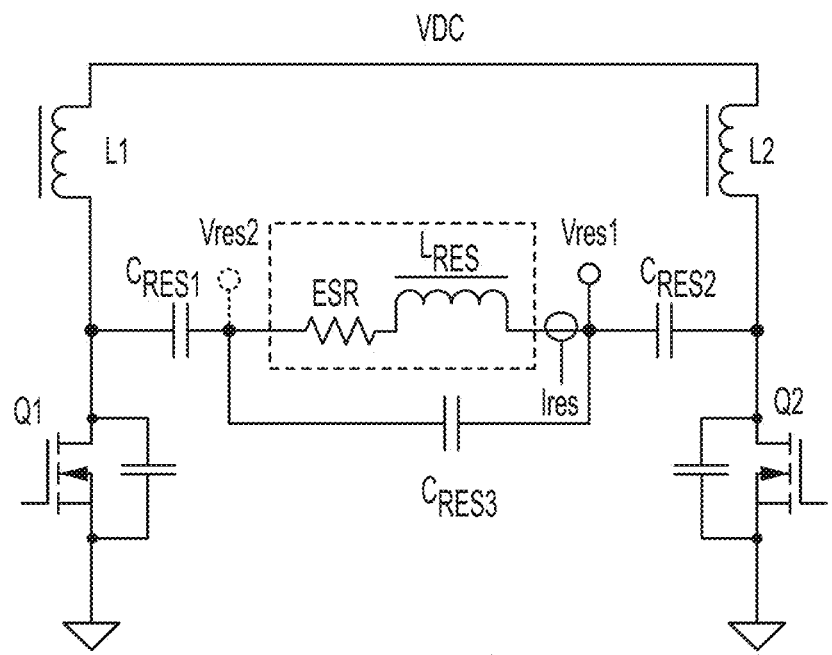

In step S5, wireless power transmission by the wireless power transmitter 1 may be enabled or inhibited based on the result of the analysis. If the measured temporal parameter or quality factor Q is outside of an acceptable range, wireless power transmission may be inhibited. If the measured decay is within an acceptable range, power transmission may be enabled, and the wireless power transmitter 1 may be allowed to enter the power transmission mode. The quality factor Q considered acceptable may be based on quality factor provided by a wireless power receiver to the wireless power transmitter via in-band or out-of-band communication FIGS. 6A-6C show examples of drive circuit 7 implemented as class D amplifiers. FIGS. 6A and 6B show a single ended (half-bridge) configuration in which inverter 3 is implemented by transistors Q1 and Q2, matching network 6 is implemented by capacitor CRES. Transmit coil 10 is represented by inductor LRES and an equivalent series resistance (ESR). FIG. 6C shows a differential (full-bridge) configuration in which inverter 3 is implemented by transistors Q1-Q4, matching network 6 is implemented by capacitors CRES1, CRES2 and CRESS. The drive circuit 7 is powered by a DC supply voltage VDC. FIGS. 7A-7C show examples of drive circuit 7 implemented as class E amplifiers.

Figure 8:
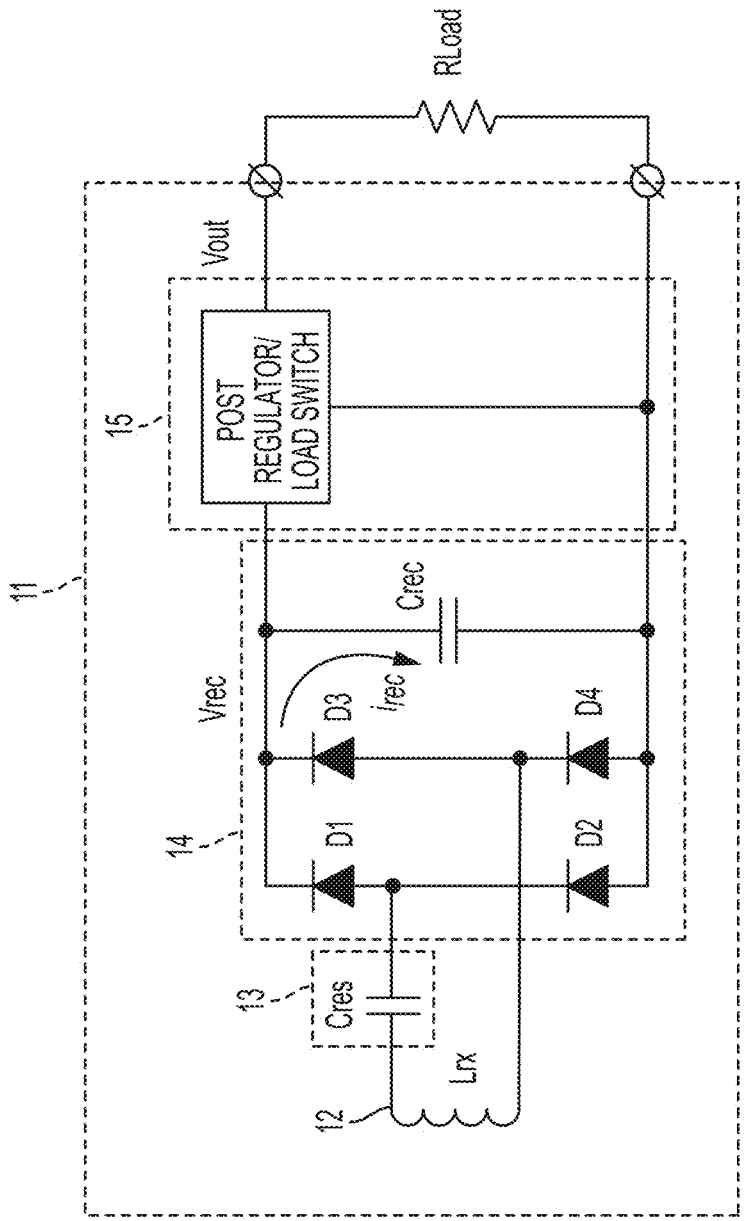
FIG. 8 shows an example of wireless power reception circuitry for a wireless power receiver.

FIG. 8 shows an example of wireless power reception circuitry for a wireless power receiver 11. Matching network 13 is implemented by a capacitor CRES. Rectifier 14 is implemented by a full-bridge diode rectifier with an output filter capacitor Crec having a voltage Vrec across it. DC/DC converter 15 is implemented by a post regulator/load switch that produces Vout.

Having shown examples of drive circuit 7 and an example of wireless power reception circuitry for a wireless power receiver 11, examples of ways in which the method of FIG. 5 may be applied thereto will be described.

Referring again to FIG. 5, and as discussed above, step S1 involves increasing the energy stored in matching network 6 and/or transmit coil 10 and exciting their resonance. In the context of the drive circuits of FIGS. 6 and 7, step S1 may include increasing the energy stored in any one or more of the capacitive or inductive elements of the drive circuit 7. Initially, the energy stored in drive circuit 7 may be zero. However, the techniques described herein are not limited to starting with zero energy stored in the drive circuit 7. In some embodiments, energy may be transferred to the drive circuit 7 by switching one or more transistors of the inverter 3 to provide energy to the capacitor(s) and/or inductor(s) of the drive circuit 7 from the supply voltage VDC.

As an example, the switches of the inverter 3 may be switched at a selected switching frequency to transfer energy into the drive circuit 7. The amount of energy transferred to the drive circuit 7 by switching the inverter 3 depends upon the magnitude of the supply voltage VDC, the switching frequency, and the amount of time for which the switching occurs. In some embodiments, it is desirable to limit the amount of energy transferred to the drive circuit to limit power dissipation when performing foreign object detection. The amount of energy transferred may be limited by setting VDC at a lower voltage during foreign object detection as compared to its value during power transmission. Alternatively or additionally, the switching frequency may be selected to control the amount of energy transferred. The farther away the switching frequency of the inverter 3 is from the resonant frequency of the drive circuit 7, the less energy will be transferred into the drive circuit 7 per unit time. The amount of time for which inverter 3 is switched also affects the amount of energy transferred. Reducing the amount of time for which inverter 3 is switched can reduce the amount of energy transferred to drive circuit 7. However, the techniques described herein are not limited to transferring energy into the drive circuit 7 by switching the inverter 3, as in some embodiments energy transfer to the drive circuit 7 may be performed by connecting the passive component(s) of drive circuit 7 to VDC (e.g., through inverter 3), or a separate circuit may be used to provide energy to the passive component(s).

Figure 9:
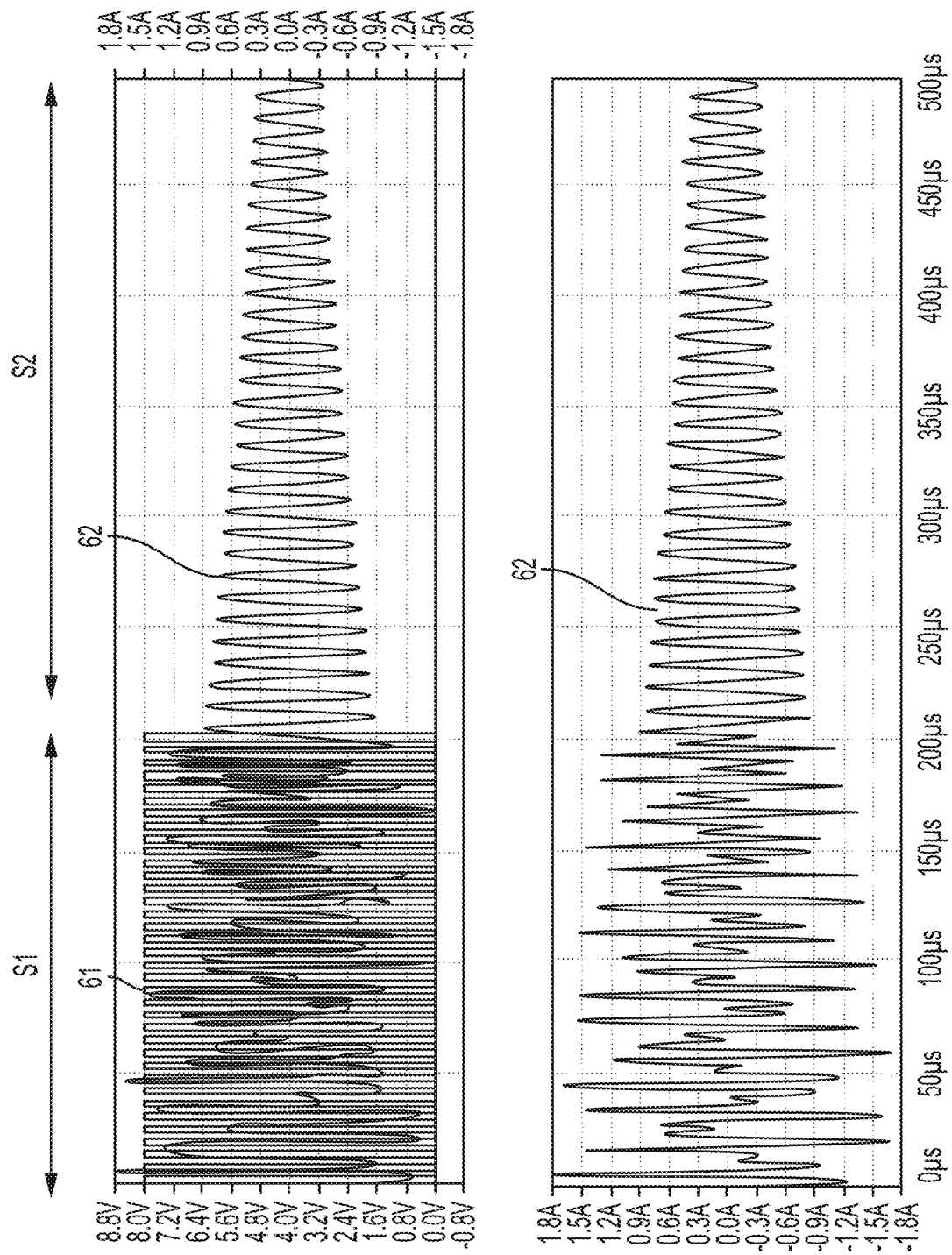
FIG. 9 shows waveforms for an example in which stimulus is performed by switching the inverter of FIG. 6C at a single switching frequency and supply voltage VDC, with no wireless power receiver present.
Figure 9:
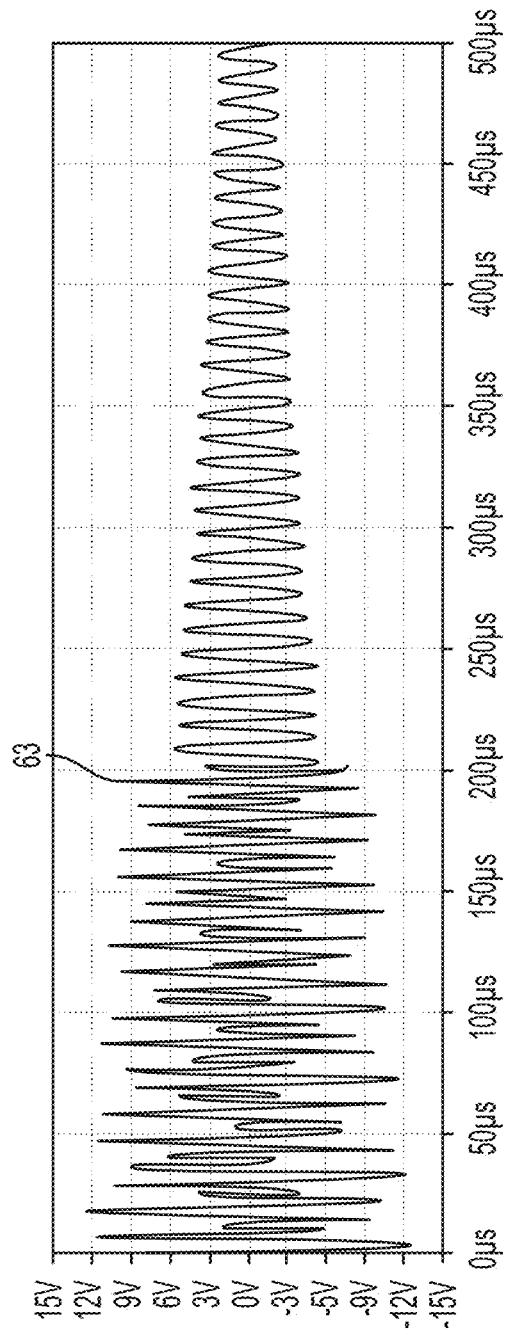

FIG. 9 shows waveforms for an example in which step S1 is performed by switching inverter 3 of FIG. 6C at a single switching frequency and supply voltage VDC, with no wireless power receiver 11 present. In this example, VDC is 8V, which causes inverter 3 to produce a square wave of 8 Vpp, as shown by waveform 61. In this example, the switching frequency of the inverter 3 is 175 kHz. The switching of inverter 3 in step S1 is performed for 206 microseconds. Then, S1 ends by stopping the switching of inverter 3, and the resonance is allowed to freely decay in step S2. The current through inductor LRES is shown as waveform 62. The voltage of node Vres1 is shown as waveform 63. As can be seen from waveforms 62 and 63, the resonance decays freely in step S2 once the stimulus in step S1 is stopped.

Figure 10:
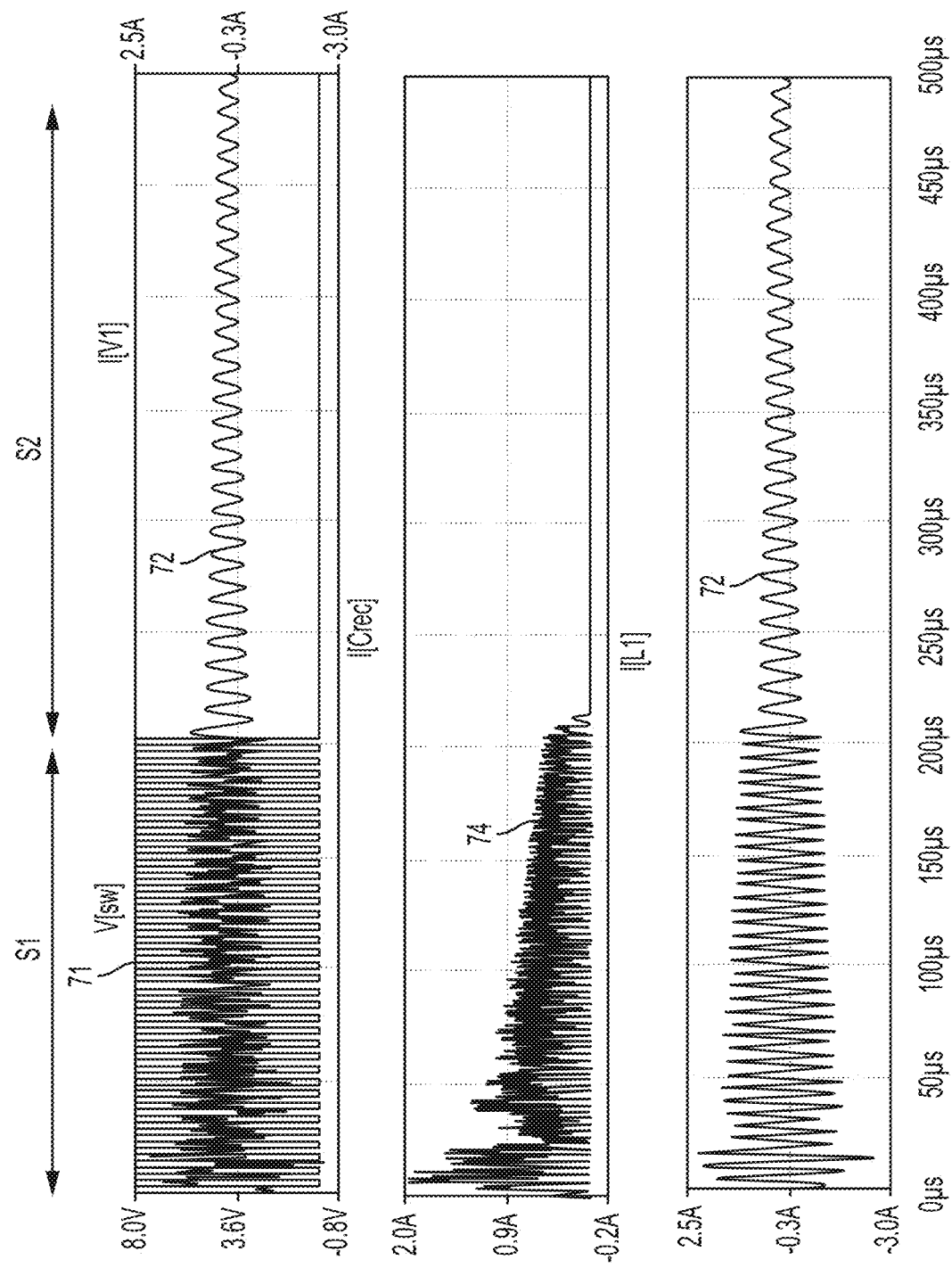
FIG. 10 shows waveforms for an example similar to FIG. 9 in which a wireless power recover is present in the field produced by the wireless power transmitter.
Figure 10:
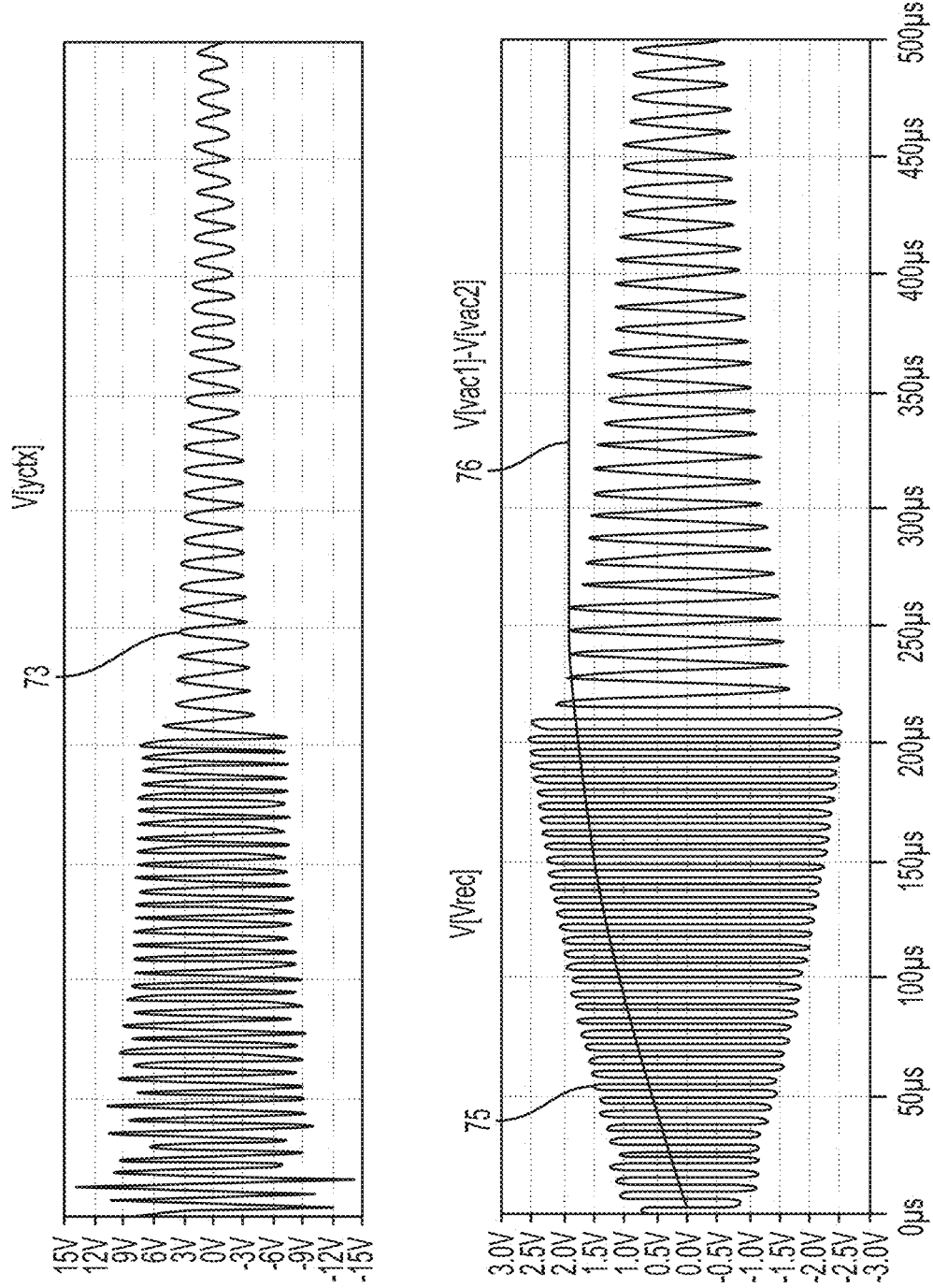

FIG. 10 shows waveforms for an example similar to FIG. 9 in which a wireless power receiver 11 is present in the field produced by the wireless power transmitter 1. The present inventors have recognized and appreciated that when a wireless power receiver 11 is present the decay of the resonance can vary depending on the state of charge of the filter capacitor of the rectifier filter capacitor Crec (FIG. 8). If Crec is not charged to a point where the diodes of the rectifier 14 are reverse-biased, the resonance at the wireless power transmitter 1 may be loaded by the wireless power receiver to charge Crec. This can affect the rate at which the resonance of the transmitter decays, which may affect the measurement of the decay, and thus impact the accuracy of foreign object detection.

FIG. 10 illustrates this problem. FIG. 10 shows the stimulus waveform 71 produced by inverter 3, waveform 72 showing the current through inductor LRES, waveform 73 showing the voltage of node Vres1, waveform 74 showing the current through rectifier filter capacitor Crec, waveform 75 showing the voltage at the input of the rectifier 14, and waveform 76 showing the voltage across the rectifier filter capacitor Crec. In this example, the rectifier filter capacitor Crec has a capacitor of 40 µF, by way of illustration. The stimulus waveform 71 frequency, voltage and duration are the same as that discussed above with respect to FIG. 9. In the example of FIG. 10, since the wireless power receiver is present the rectifier filter capacitor Crec charges up during the period in which the stimulus waveform 71 is applied in step S1. The inventors have recognized and appreciated that if capacitor Crec is not fully charged by the end of step S1 it may continue to charge during step S2, which may load the decaying resonance at the transmitter and skewing the measurement of the resonance decay. FIG. 10 illustrates in waveforms 76 and 74 that the rectifier filter capacitor Crec is not fully charged by the end of step S1, such that current continues to flow into the rectifier filter capacitor Crec during S2, which may adversely affect the measurement of the resonance decay.

Figure 11:
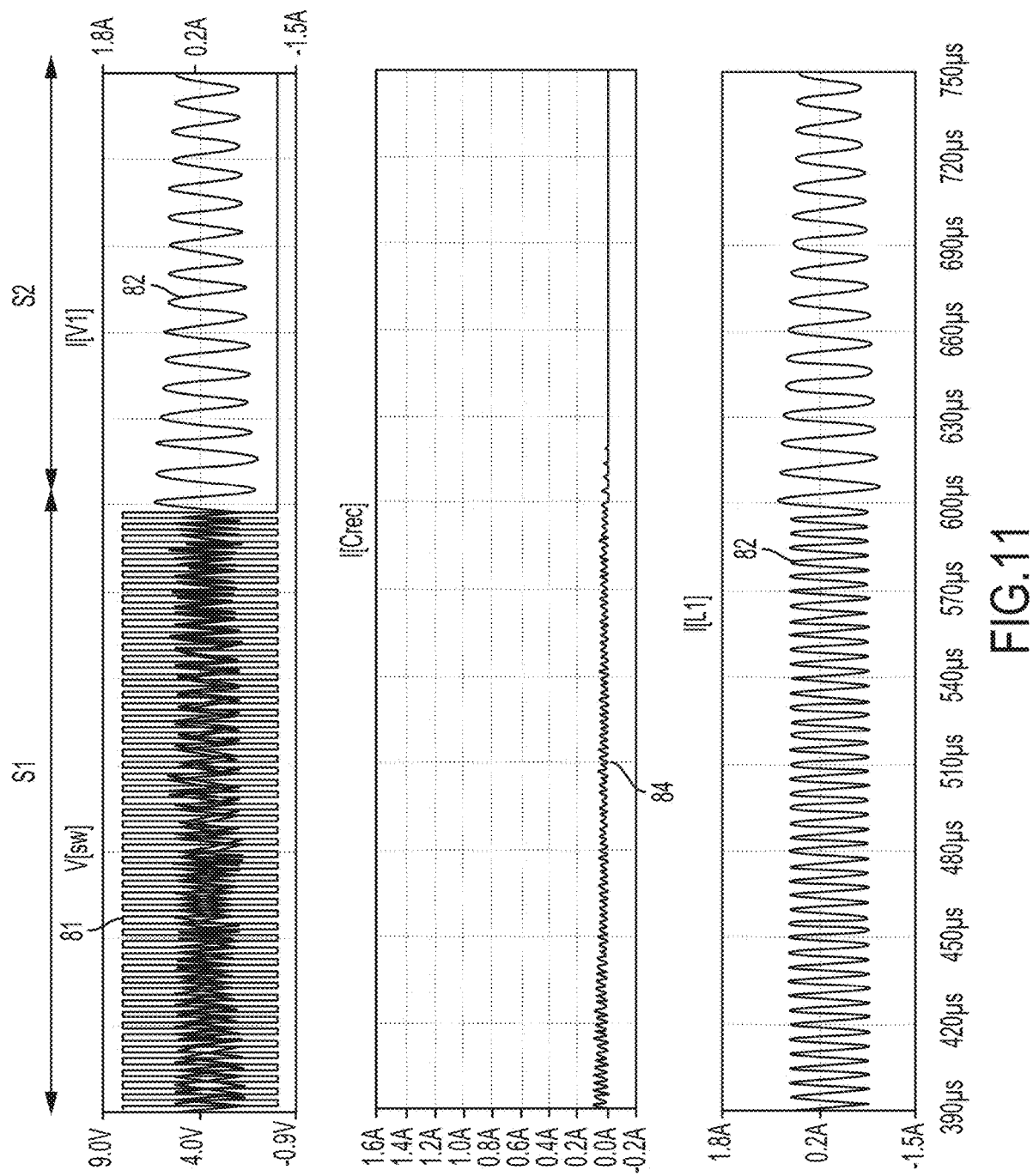
FIG. 11 shows an example of a stimulus that can fully charge the rectifier filter capacitor Crec.
Figure 11:
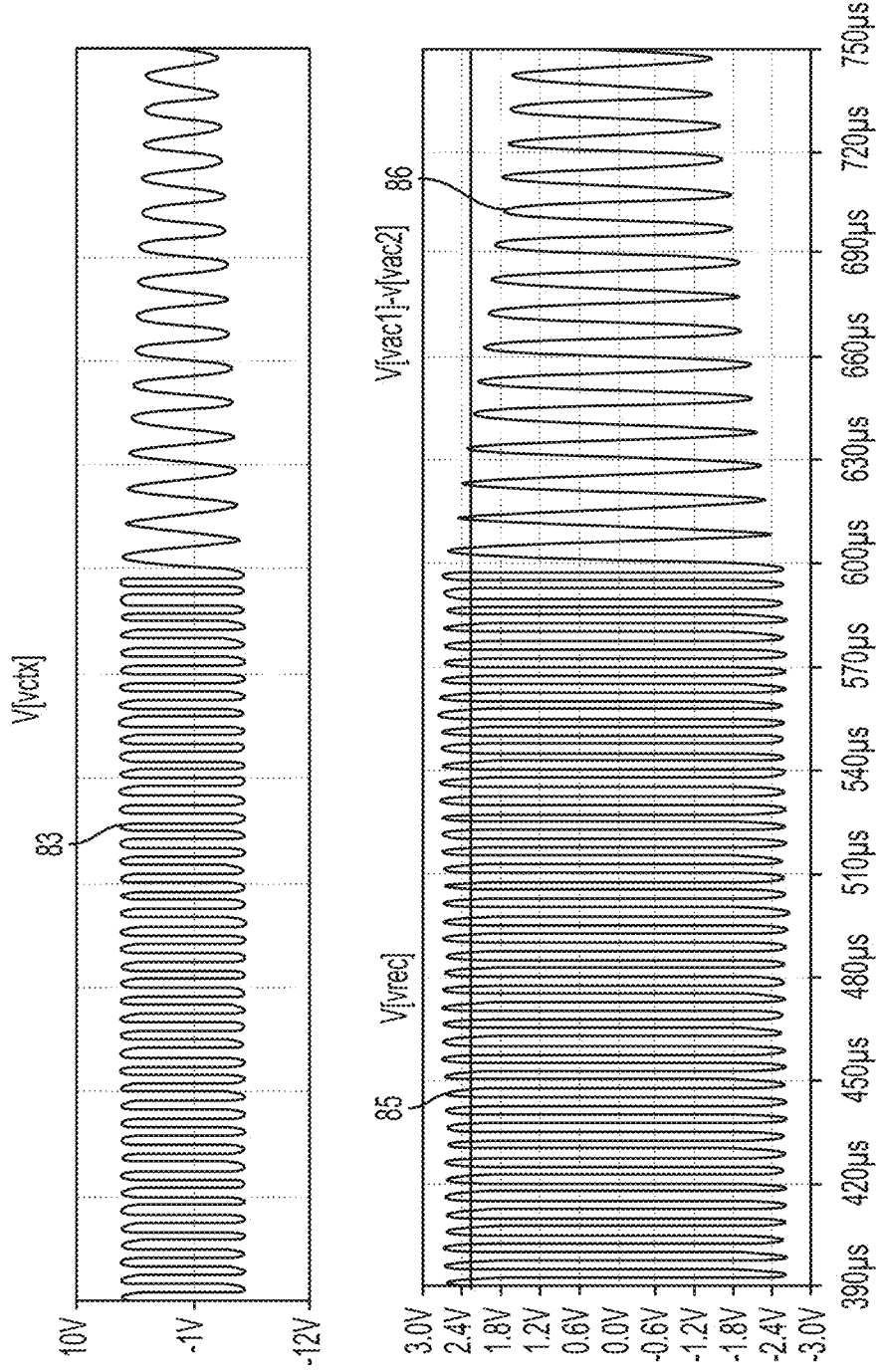

FIG. 11 shows an example of a stimulus that can fully charge the rectifier filter capacitor Crec prior to step S2. In this example, VDC is 8V, the switching frequency of the inverter 3 is 200 kHz, and step S1 lasts 600 microseconds. FIG. 11 shows the stimulus waveform 81 produced by inverter 3, waveform 82 showing the current through inductor LRES, waveform 83 showing the voltage of node Vres1, waveform 84 showing the current through rectifier filter capacitor Crec, waveform 85 showing the voltage at the input of the rectifier 14, and waveform 86 showing the voltage across the rectifier filter capacitor Crec. As shown, the rectifier filter capacitor Crec can be fully charged before the start of step S2 by applying the stimulus for a sufficient duration. However, one disadvantage of this approach is that it involves increasing the length of step S1, which may be inefficient, as power may be dissipated during step S1.

In some embodiments, the duration of step S1 can be reduced by applying a sequence of inverter stimulus waveforms at different energy levels. The inverter stimulus waveform may have a period of time in which relatively high energy level is applied, followed by a period of time with a lower energy level applied. Using a relatively high energy level initially allows charging the rectifier filter capacitor Crec quickly. Then, the energy level can be reduced to allow improved efficiency.

Applying a sequence of inverter stimulus waveforms can include applying a "double stimulus" in which a first stimulus is applied in step S1a and a second stimulus is applied in step S1b, which may be at a lower power level than in step S1a. However, the techniques described herein are not limited to applying two different stimulus levels, as any number of different stimulus levels may be applied.

As mentioned above, the stimulus applied step S1a may be of a higher energy level than the stimulus applied in step S1b. The energy level is affected by the voltage level VDC used to power the inverter 3, the switching frequency, and the amount of time for which a stimulus is applied. Increasing VDC or the amount of time for which the stimulus is applied increases the amount of energy provided. A switching frequency close to the resonant frequency of the transmitter provides a higher energy level than a switching frequency farther away from the resonant frequency. Any combination of these parameters may be varied to adjust the energy level applied in subsequent stimulus steps S1a, S1b, etc.

Figure 12:
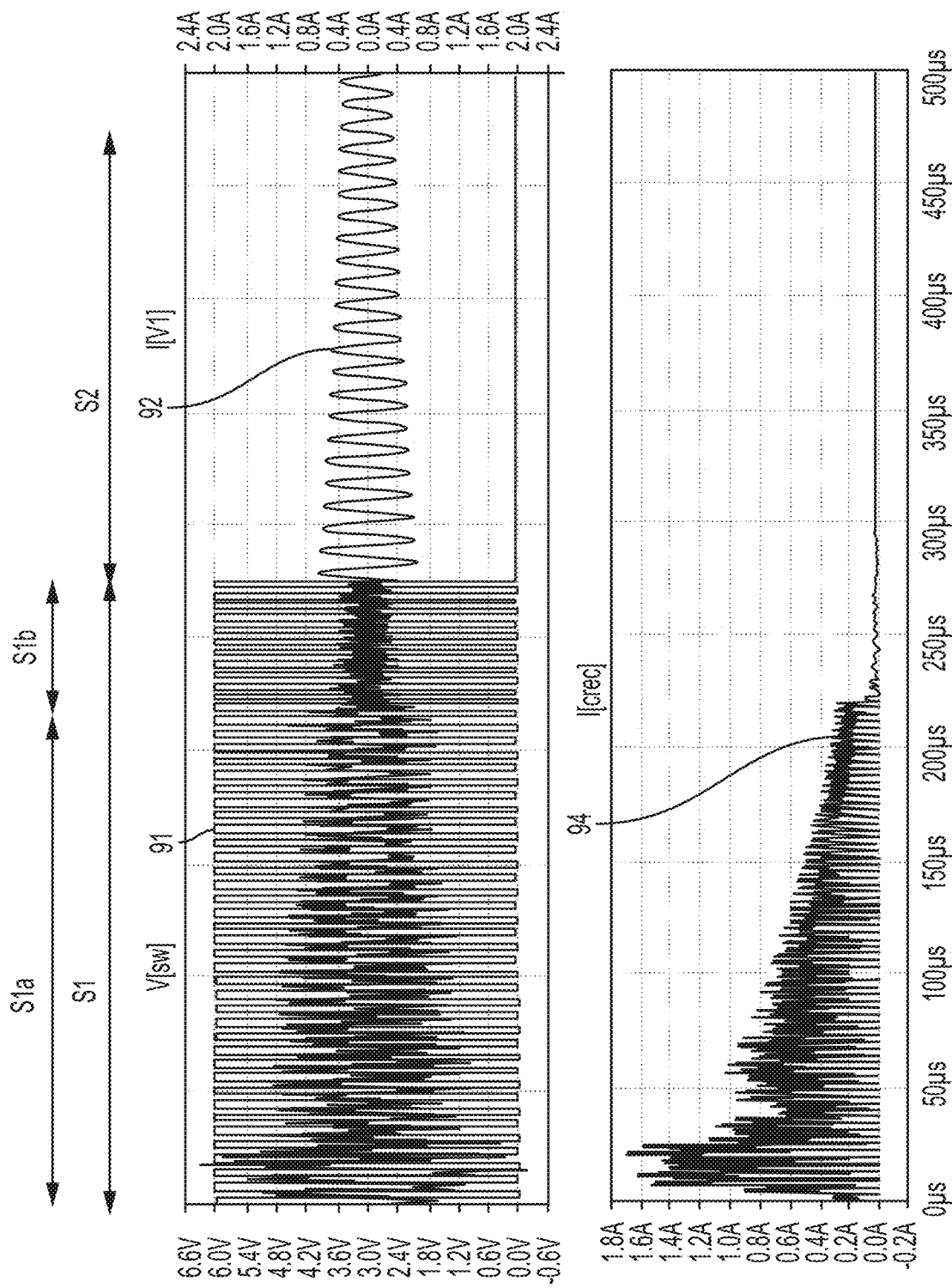
FIG. 12 shows an example of a double stimulus in which the switching frequency is changed.
Figure 12:
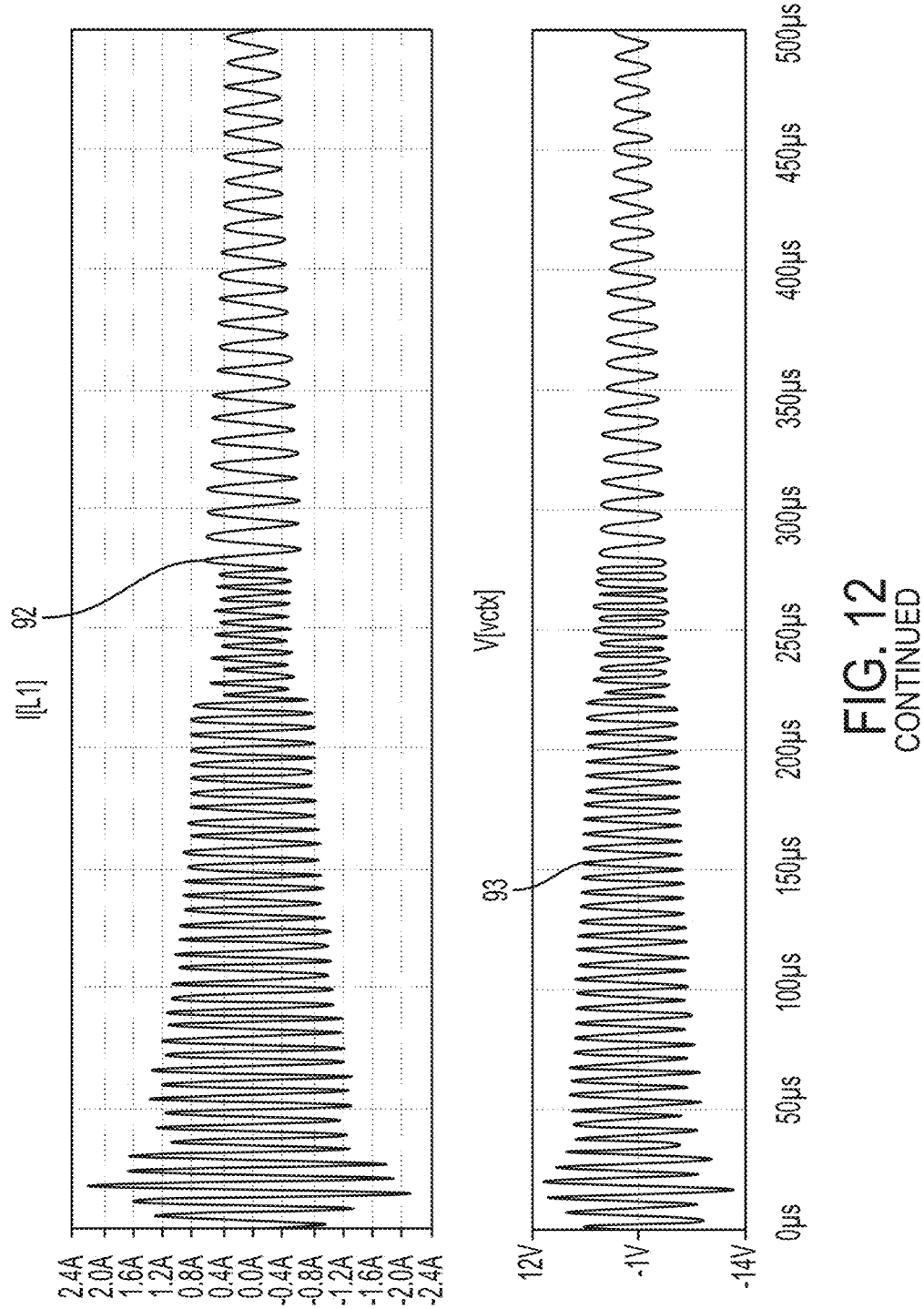
Figure 12:
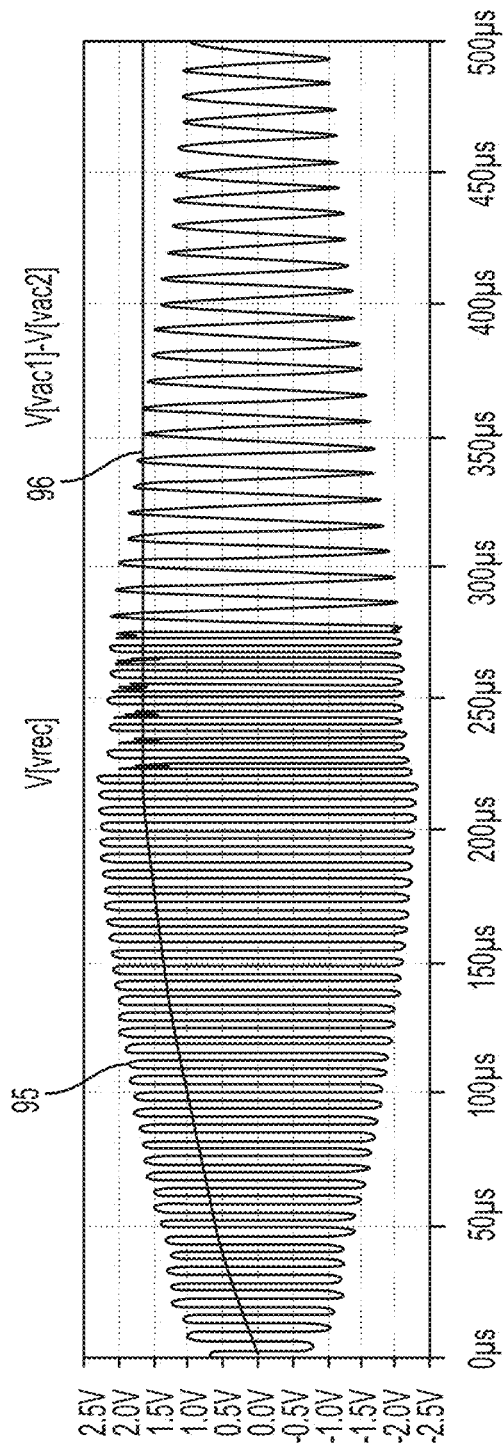

FIG. 12 shows an example of a double stimulus. FIG. 12 shows the stimulus waveform 91 produced by inverter 3 includes a first portion in step S1a and a second portion in step S1b. In step S1a, VDC is 6V, the duration is 206 µs and the switching frequency is 165 kHz. In step S1b, VDC is 6V, the duration is 60 s and the switching frequency is 200 kHz. Since the transmitter resonant frequency is approximately 100 kHz, the stimulus applied in step S1a has a switching frequency closer to the resonant frequency, which provides relatively high energy input. In step S1b, the energy is reduced by increasing the switching frequency. As shown, the rectifier filter capacitor Crec is fully charged before the start of step S2, and the duration of step S1 is less than in the example of FIG. 11. FIG. 12 also shows waveform 92 showing the current through inductor LRES, waveform 93 showing the voltage of node Vres1, waveform 94 showing the current through rectifier filter capacitor Crec, waveform 95 showing the voltage at the input of the rectifier 14, and waveform 96 showing the voltage across the rectifier filter capacitor Crec.

Figure 13:
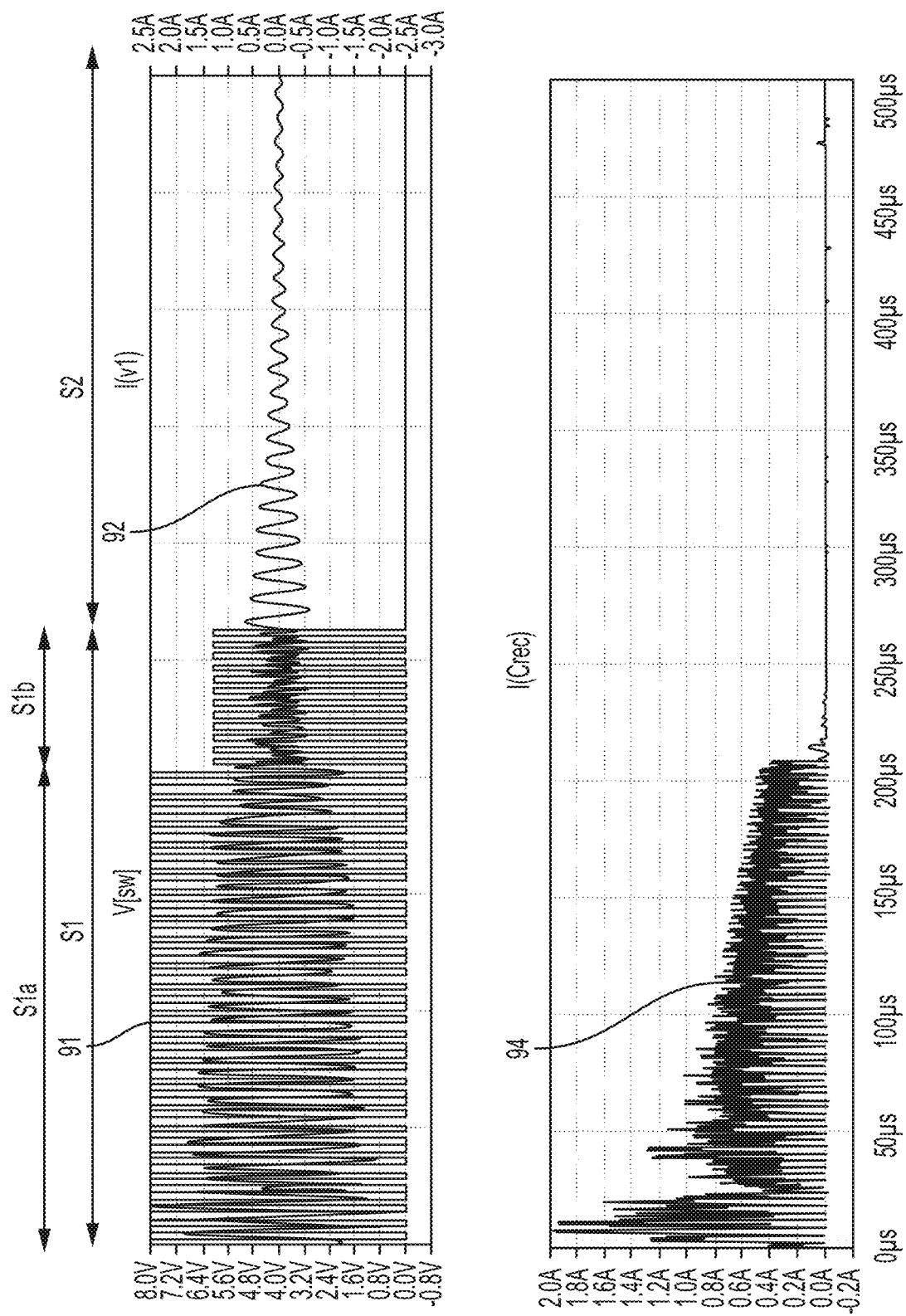
FIG. 13 shows an example of a double stimulus in which the supply voltage is changed.
Figure 13:
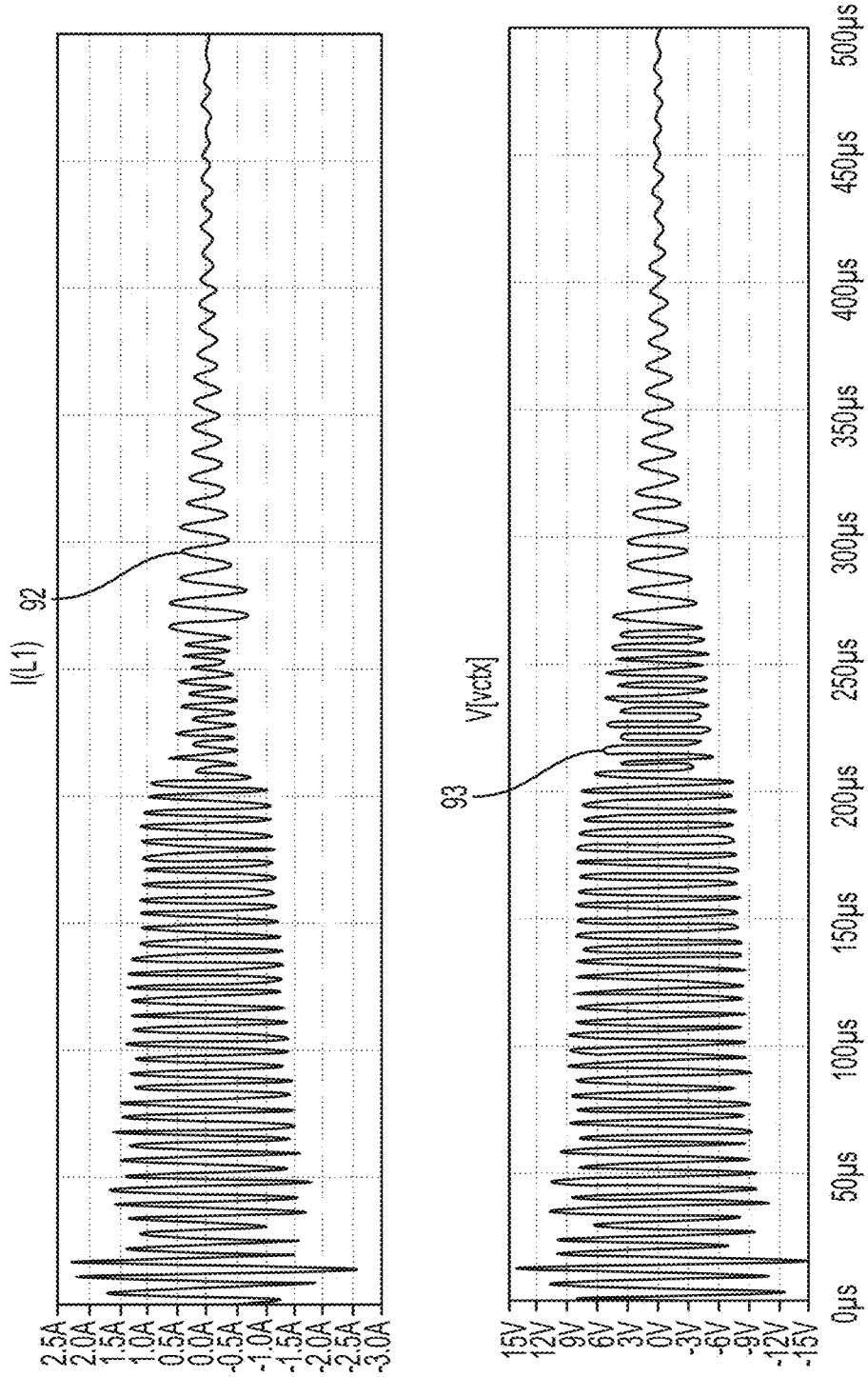
Figure 13:
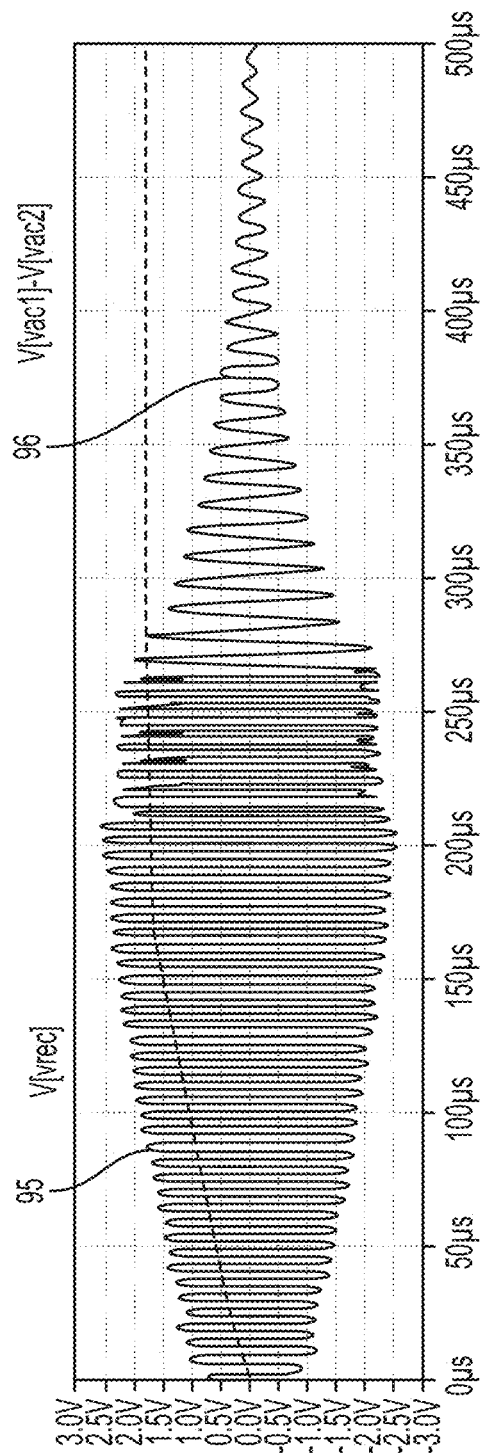

FIG. 13 shows an example of a double stimulus similar to FIG. 12, in which the energy is reduced in step S1b by decreasing the voltage VDC rather than changing the switching frequency. In this example, VDC is 8V in step S1a and then is reduced to 6V in step S1b.

Figure 14:
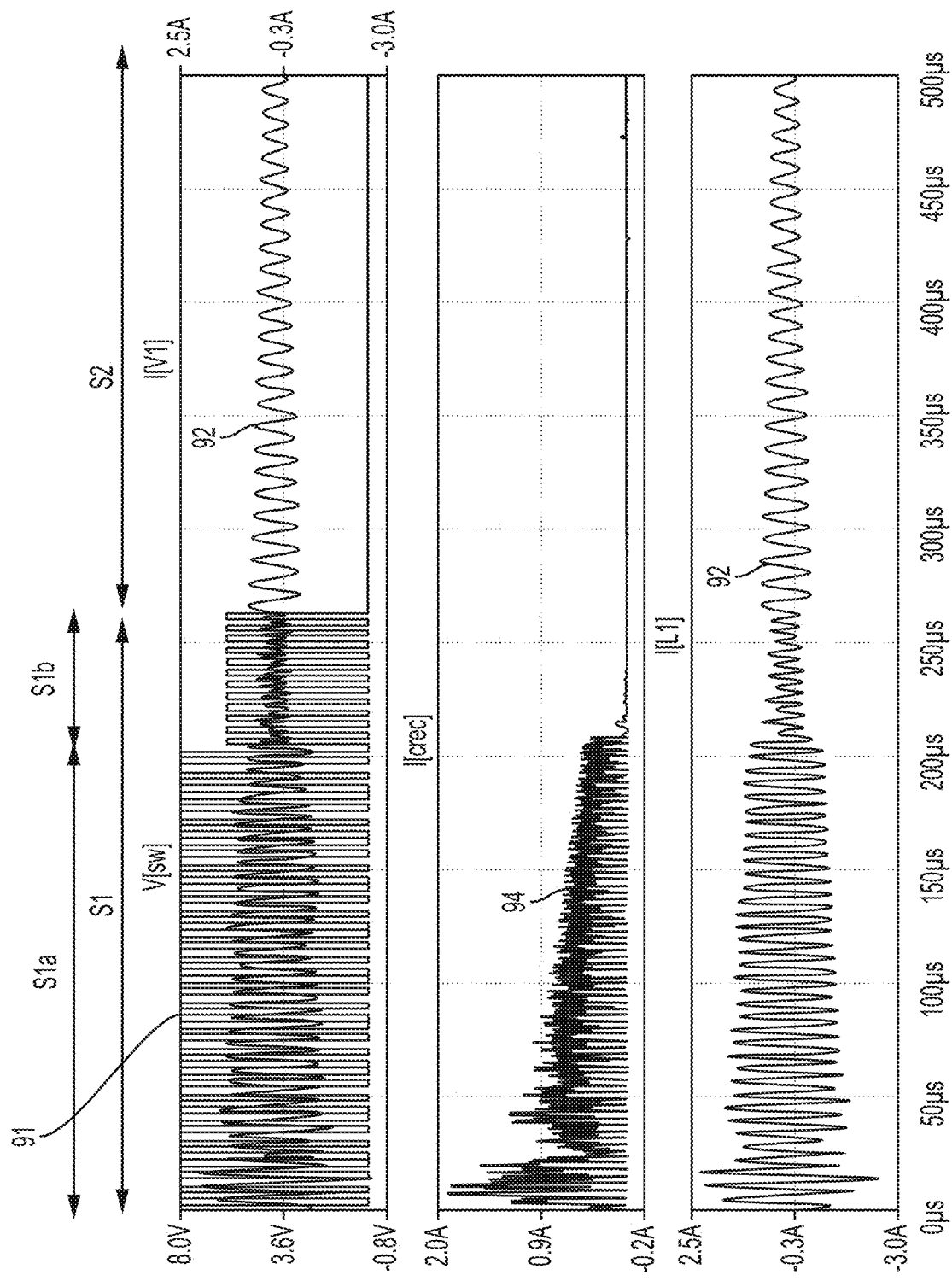
FIG. 14 shows an example of a double stimulus in which both the switching frequency and supply voltage are changed.
Figure 14:
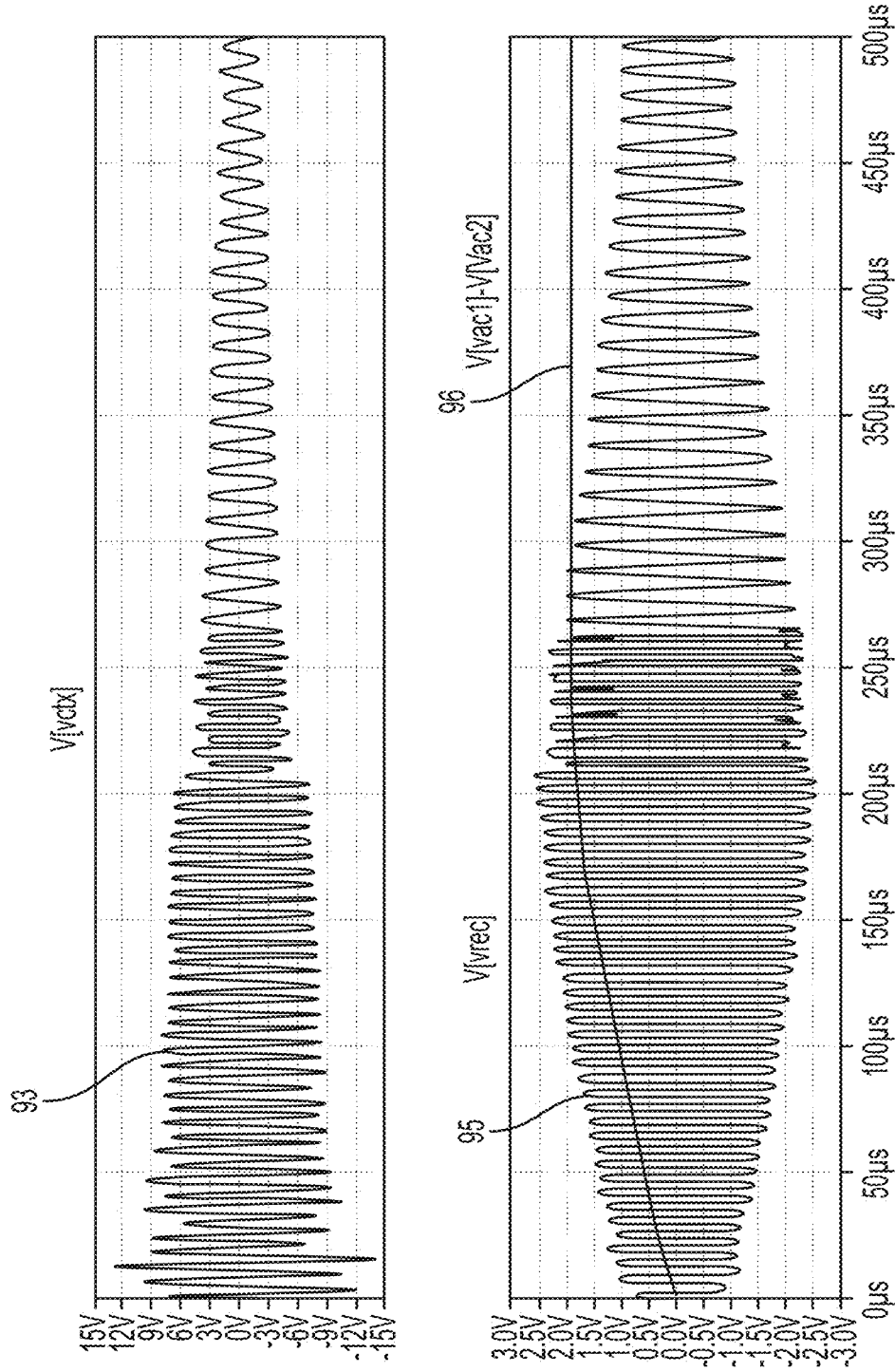

FIG. 14 shows an example of a double stimulus similar to FIGS. 12 and 13 in which the energy is reduced in step S1b both by decreasing the voltage VDC and changing the switching frequency in the way described above in FIGS. 12 and 10.

As discussed above, in step S2 the resonance of the transmitter is allowed to decay, and in step S3, a temporal characteristic of the resonance decay may be measured. For example, a decay time of the resonance decay may be measured, and/or the quality factor Q may be determined. The measurement of the temporal characteristic may be performed using continuous time or discrete time measurements.

Figure 15:
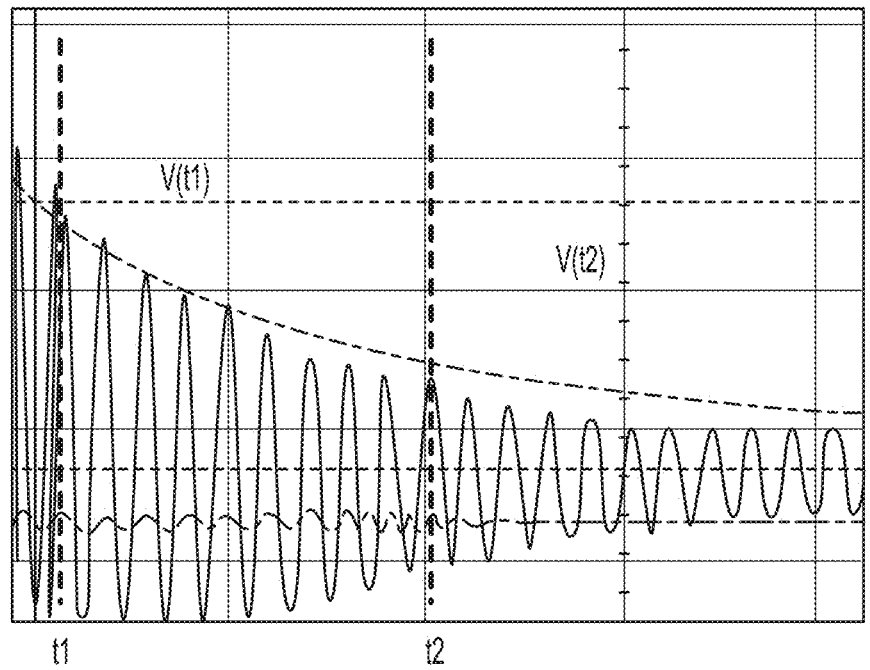
FIG. 15 shows an example of continuous time measurements.

FIG. 15 shows an example of performing the measurement of step S3 using continuous time measurements. A peak detector of controller 5 or a separate peak detector may be used to detect the envelope of the decaying waveform. As shown in FIG. 15, measurements V(t1) and V(t2) are made at times t1 and t2, respectively. The quality factor Q may be determined using the following equations.

For $Q > 10$, $$V(t) = V(0) \cdot \exp\left[\frac{-\omega \cdot t}{2 \cdot Q}\right];$$

$$\omega = \frac{2\pi}{T}$$

$$Q = \frac{\pi \cdot (t_2 - t_1)}{T \cdot \ln\left[\frac{V(t_2)}{V(t_1)}\right]};$$

Figure 16:
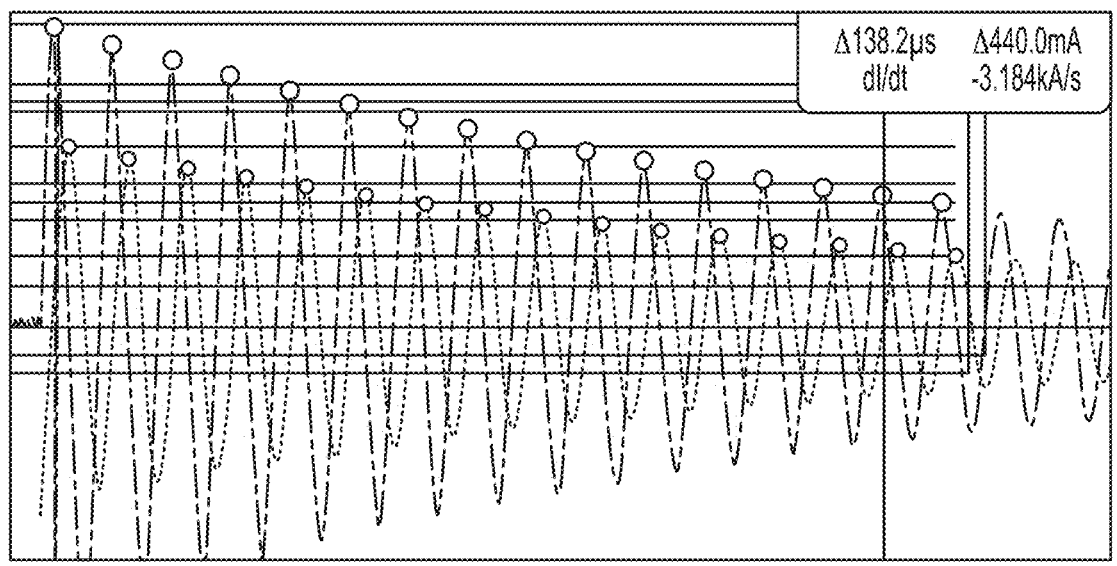
FIG. 16 shows an example of discrete time measurements.

FIG. 16 shows an example of determining Q using discrete time measurements. The peaks of the waveform as shown in FIG. 16 may be determined, then Q may be determined using the following equations.

For $Q > 10$, $$V(n) = V(0) \cdot \exp\left[\frac{-2\pi \cdot n}{2 \cdot Q}\right];$$

$$Q = \frac{\pi \cdot n}{\ln\left(\frac{V(n)}{V(0)}\right)}$$

As discussed above, a multi-mode wireless power transmitter may be controlled using controller 5, which may be implemented by any suitable type of circuitry. For example, the controller 5 may be implemented using hardware or a combination of hardware and software. When implemented using software, suitable software code can be executed on any suitable processor (e.g., a microprocessor) or collection of processors. The one or more controllers can be implemented in numerous ways, such as with dedicated hardware, or with general purpose hardware (e.g., one or more processors) that is programmed using microcode or software to perform the functions recited above.

In this respect, it should be appreciated that one implementation of the embodiments described herein comprises at least one computer-readable storage medium (e.g., RAM, ROM, EEPROM, flash memory or other memory technology, or other tangible, non-transitory computer-readable storage medium) encoded with a computer program (i.e., a plurality of executable instructions) that, when executed on one or more processors, performs the above-discussed functions of one or more embodiments. In addition, it should be appreciated that the reference to a computer program which, when executed, performs any of the above-discussed functions, is not limited to an application program running on a host computer. Rather, the terms computer program and software are used herein in a generic sense to reference any type of computer code (e.g., application software, firmware, microcode, or any other form of computer instruction) that can be employed to program one or more processors to implement aspects of the techniques discussed herein.

Various aspects of the apparatus and techniques described herein may be used alone, in combination, or in a variety of arrangements not specifically discussed in the embodiments described in the foregoing description and is therefore not limited in its application to the details and arrangement of components set forth in the foregoing description or illustrated in the drawings. For example, aspects described in one embodiment may be combined in any manner with aspects described in other embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A method of performing wireless power transmission from a wireless power transmitter to a wireless power receiver, the method comprising:
   receiving a reference value from the wireless power receiver, the reference value being a reference Q-factor or self-resonant frequency;
   determining a foreign object detection (FOD) value based on the reference value and one or more characteristics of the wireless power transmitter;
   performing a plurality of Q-factor measurements or a plurality of self-resonant frequency measurements at different times to reduce an effect of erroneous measurement; and
   determining whether to enable or disable wireless power transfer based on the plurality of Q-factor measurements or the plurality of self-resonant frequency measurements, and the FOD value.

2. The method of claim 1, further comprising determining whether the plurality of Q-factor measurements or the plurality of self-resonant frequency measurements converge.

3. The method of claim 2, wherein a number of the plurality of Q-factor measurements or the plurality of self-resonant frequency measurements is based upon whether the plurality of Q-factor measurements or the plurality of self-resonant frequency measurements converge.

4. The method of claim 2, wherein determining whether the plurality of Q-factor measurements or the plurality of self-resonant frequency measurements converge comprises determining a minimum, average and/or median of the plurality of Q-factor measurements or the plurality of self-resonant frequency measurements.

5. The method of claim 1, further comprising discarding one or more measurements of the plurality of Q-factor measurements or the plurality of self-resonant frequency measurements and the determining whether or not to disable wireless power transfer is based on one or more non-discarded measurements of the plurality of Q-factor measurements or the plurality of self-resonant frequency measurements.

6. An apparatus for performing foreign object detection, the apparatus comprising:
   circuitry configured to:
   receive a reference value from a wireless power receiver, the reference value being a reference Q-factor or self-resonant frequency;
   determine a foreign object detection (FOD) value based on the reference value and one or more characteristics of a wireless power transmitter;
   perform a plurality of Q-factor measurements or a plurality of self-resonant frequency measurements at different times to reduce an effect of erroneous measurement; and
   determine whether to enable or disable wireless power transfer based on the plurality of Q-factor measurements or the plurality of self-resonant frequency measurements, and the FOD value.

7. The apparatus of claim 6, wherein the circuitry comprises:
   a drive circuit configured to energize a matching network and transmit coil of a wireless power transmitter; and a controller configured to perform the plurality of Q-factor measurements or the plurality of self-resonant frequency measurements at least in part by controlling the drive circuit, process the plurality of Q-factor measurements or the plurality of self-resonant frequency measurements to obtain a FOD measurement result and determine whether to enable or disable wireless power transfer based on the FOD measurement result.

8. The apparatus of claim 7, wherein the controller is configured to determine whether the plurality of Q-factor measurements or the plurality of self-resonant frequency measurements converge.

9. The apparatus of claim 8, wherein a number of the plurality of Q-factor measurements or the plurality of self-resonant frequency measurements is based upon whether the plurality of Q-factor measurements or the plurality of self-resonant frequency measurements converge.

10. The apparatus of claim 7, wherein the controller is configured to determine whether the plurality of Q-factor measurements or the plurality of self-resonant frequency measurements converge at least in part by determining a minimum, average and/or median of the plurality of Q-factor measurements or the plurality of self-resonant frequency measurements.

11. The apparatus of claim 7, wherein the controller is configured to discard one or more measurements of the plurality of Q-factor measurements or the plurality of self-resonant frequency measurements and to determine whether or not to disable wireless power transfer based on one or more non-discarded measurements of the plurality of Q-factor measurements or the plurality of self-resonant frequency measurements.

12. A method of performing foreign object detection in a wireless power transmission system having a wireless power transmitter and a wireless power receiver, the method comprising:
the wireless power transmitter receiving a reference value from the wireless power receiver, the reference value being a reference Q-factor or self-resonant frequency;
the wireless power transmitter determining a foreign object detection (FOD) value based on the reference value and one or more characteristics of the wireless power transmitter;
the wireless power transmitter determining whether to enable or disable wireless power transfer based on a comparison of the FOD value and a threshold; and
the wireless power transmitter performing wireless power transfer to the wireless power receiver when the determination is made to enable wireless power transfer.

13. The method of claim 12, wherein the threshold is based on a stored relationship between Q-factors or self-resonance frequencies for a transmitter-receiver pair of the wireless power transmitter and the wireless power receiver, and FOD thresholds.

14. An apparatus for performing foreign object detection in a wireless power transmission system having a wireless power transmitter and a wireless power receiver, the apparatus comprising:
circuitry configured to:
receive a reference value from the wireless power receiver, the reference value being a reference Q-factor or self-resonant frequency;
determine a foreign object detection (FOD) value based on the reference value and one or more characteristics of the wireless power transmitter;
determine whether to enable or disable wireless power transfer based on a comparison of the FOD value and a threshold; and
perform wireless power transfer to the wireless power receiver when the determination is made to enable wireless power transfer.

15. The apparatus of claim 14, wherein the circuitry is configured to set the FOD value based on a stored relationship between Q-factors or self-resonance frequencies for the wireless power transmitter and wireless power receiver pair and FOD thresholds.

* * * * *